(12) United States Patent
Park et al.

(10) Patent No.: US 12,229,365 B2
(45) Date of Patent: Feb. 18, 2025

(54) ELECTRONIC DEVICE INCLUDING SHIELDING MEMBER

(71) Applicant: SAMSUNG ELECTRONICS CO., LTD., Suwon-si (KR)

(72) Inventors: Sangil Park, Suwon-si (KR); Jungchul An, Suwon-si (KR); Myeongsu Oh, Suwon-si (KR); Jaedeok Lim, Suwon-si (KR); Gyuyeong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 17/885,910

(22) Filed: Aug. 11, 2022

(65) Prior Publication Data
US 2023/0046690 A1    Feb. 16, 2023

Related U.S. Application Data

(63) Continuation of application No. PCT/KR2022/011733, filed on Aug. 8, 2022.

(30) Foreign Application Priority Data

Aug. 10, 2021   (KR) .................. 10-2021-0104971

(51) Int. Cl.
G06F 3/041   (2006.01)
H04M 1/02   (2006.01)
G06F 3/046   (2006.01)

(52) U.S. Cl.
CPC ...... *G06F 3/04162* (2019.05); *H04M 1/0268* (2013.01); *G06F 3/046* (2013.01);
(Continued)

(58) Field of Classification Search
None
See application file for complete search history.

(56) References Cited

U.S. PATENT DOCUMENTS 10,539,981 B2    1/2020   Lin et al.
2018/0364761 A1    12/2018   Lin et al.
(Continued)

FOREIGN PATENT DOCUMENTS

CN    110718152    1/2020
CN    113236657    8/2021
(Continued)

OTHER PUBLICATIONS

Search Report and Written Opinion dated Aug. 10, 2022 issued in International Patent Application No. PCT/KR2022/011733.

*Primary Examiner* — Suhail Khan
(74) *Attorney, Agent, or Firm* — Nixon & Vanderhye, P.C.

(57) ABSTRACT

According to various embodiments of the disclosure, an electronic device may include: a hinge plate coupled at least in part between a first support including a first magnet and a second support including a second magnet, a first housing coupled at least in part to a first side of the hinge plate through the first support, a second housing coupled at least in part to a second side of the hinge plate through the second support and configured to be foldable with the first housing through the hinge plate, and a flexible display supported on the first and second supports and configured to be foldable. The flexible display may include: a display panel; a support plate disposed on a lower surface of the display panel; a first digitizer and a second digitizer disposed on a lower surface of the support plate spaced apart from each other through a second gap; a first-first shielding member comprising a magnetic shielding material and a first-second shielding
(Continued)

member comprising a magnetic shielding material disposed on lower surfaces of the first and second digitizers spaced apart from each other through a third gap; a first metal plate and a second metal plate disposed on lower surfaces of the first-first and first-second shielding members spaced apart from each other through a fourth gap; a third-first shielding member comprising a magnetic shielding material disposed on an upper surface of a first magnetization region of the first support in a first space between the first metal plate and the first support, and a third-second shielding member comprising a magnetic shielding material spaced apart from the third-first shielding member through a sixth gap and disposed on an upper surface of a second magnetization region of the second support in a second space between the second metal plate and the second support; and a fourth-first shielding member comprising a magnetic shielding material disposed on an upper surface of the third-first shielding member and surrounding at least a portion of the third-first shielding member through the sixth gap, and a fourth-second shielding member comprising a magnetic shielding material spaced apart from the fourth-first shielding member through the sixth gap, disposed on an upper surface of the third-second shielding member, and surrounding at least a portion of the third-second shielding member through the sixth gap.

20 Claims, 10 Drawing Sheets

(52) U.S. Cl.
CPC .............. *G06F 2203/04102* (2013.01); *G06F 2203/04107* (2013.01)

(56) References Cited

U.S. PATENT DOCUMENTS

| | | |
|---|---|---|
| 2020/0081562 A1 | 3/2020 | Shi |
| 2020/0169816 A1 | 5/2020 | Kim et al. |
| 2020/0236826 A1 | 7/2020 | Baek et al. |
| 2022/0043481 A1 | 2/2022 | Shin et al. |
| 2022/0129094 A1* | 4/2022 | Tatsuno ................. G06F 3/046 |

FOREIGN PATENT DOCUMENTS

| | | |
|---|---|---|
| KR | 2018-0045300 | 5/2018 |
| KR | 10-2018-0083929 | 7/2018 |
| KR | 10-2018-0090243 | 8/2018 |
| KR | 2020-0060991 | 6/2020 |
| KR | 10-2020-0090476 | 7/2020 |
| KR | 10-2020-0124099 | 11/2020 |
| WO | 2021/060556 | 4/2021 |

* cited by examiner

ELECTRONIC DEVICE INCLUDING SHIELDING MEMBER

CROSS-REFERENCE TO RELATED APPLICATIONS

This application is a continuation of International Application No. PCT/KR2022/011733 designating the United States, filed on Aug. 8, 2022, in the Korean Intellectual Property Receiving Office and claiming priority to Korean Patent Application No. 10-2021-0104971, filed on Aug. 10, 2021, in the Korean Intellectual Property Office, the disclosures of which are incorporated by reference herein in their entireties.

BACKGROUND

Field

The disclosure relates to an electronic device including at least one shielding member.

Description of Related Art

The use of electronic devices such as foldable-type smart phones is increasing, and a variety of functions are provided to the electronic devices.

The electronic device may provide various kinds of information such as text, image, or video to the user through a display.

While the electronic device is becoming miniaturized, the user's desire for the expansion of the display is increasing.

A foldable electronic device such as a foldable-type smart phone may operate such that a first housing including a first support member and a second housing including a second support member are in a folding state or an unfolding state with respect to a hinge module.

For example, the foldable electronic device may operate in an in-folding and/or out-folding style as the first and second housings are rotated through the hinge module.

The foldable electronic device may include a flexible display disposed to cross at least in part the first and second housings and correspond to upper surfaces of the first and second housings.

In the foldable electronic device, when the first and second housings are folded or unfolded through the hinge module, the flexible display may also be folded or unfolded.

The foldable electronic device may include detachably a stylus pen (e.g., an electronic pen) capable of inputting text or pictures on the flexible display by means of an electromagnetic resonance technique.

The flexible display may include a digitizer for detecting a signal inputted using the stylus pen (e.g., the electronic pen).

In the foldable electronic device, the first support member and the second support member that are combined at least in part with the hinge module may be formed of a conductive material (e.g., metal). The first support member and/or the second support member formed of the conductive material may be magnetized by an external magnetic force. A magnetization region of the first support member and/or the second support member may be shielded using a shielding member having a high magnetic permeability. When the first support member and/or the second support member are not magnetized, the shielding member may increase a reactance value of a portion of the digitizer. When the reactance value increases in the digitizer, the digitizer may not be able to acquire a flat LC resonance frequency and thus not detect an input signal through the stylus pen. In this case, the flexible display may not perform a normal function.

SUMMARY

Embodiments of the disclosure may provide an electronic device capable of preventing and/or reducing deterioration in performance of a flexible display (e.g., a digitizer) using at least one shielding member.

The technical problems to be addressed in the disclosure are not limited to the above-mentioned problems, and other technical problems not mentioned will be understood from the following description by a person skilled in the art to which the disclosure belongs.

According to various example embodiments of the disclosure, an electronic device may include: a hinge plate coupled at least in part between a first support with a first magnet and a second support with a second magnet, a first housing coupled at least in part to a first side of the hinge plate through the first support, a second housing coupled at least in part to a second side of the hinge plate through the second support and configured to be unfoldable or foldable with the first housing through the hinge plate, and a flexible display supported on the first and second supports and configured to be foldable. The flexible display may include: a display panel; a support plate disposed on a lower surface of the display panel; a first digitizer and a second digitizer disposed on a lower surface of the support plate spaced apart from each other through a second gap; a first-first shielding member comprising a shielding material and a first-second shielding member comprising a shielding material disposed on lower surfaces of the first and second digitizers spaced apart from each other through a third gap; a first metal plate and a second metal plate disposed on lower surfaces of the first-first and first-second shielding members spaced apart from each other through a fourth gap; a third-first shielding member comprising a shielding material disposed on an upper surface of a first magnetization region of the first support in a first space between the first metal plate and the first support, and a third-second shielding member comprising a shielding material spaced apart from the third-first shielding member through a sixth gap and disposed on an upper surface of a second magnetization region of the second support in a second space between the second metal plate and the second support; and a fourth-first shielding member comprising a shielding material disposed on an upper surface of the third-first shielding member and disposed to surround at least a portion of the third-first shielding member through the sixth gap, and a fourth-second shielding member comprising a shielding material spaced apart from the fourth-first shielding member through the sixth gap, disposed on an upper surface of the third-second shielding member, and disposed to surround at least a portion of the third-second shielding member through the sixth gap.

According to various example embodiments of the disclosure, by disposing at least one shielding member on the folding axis of the hinge module adjacent to the magnetization region of the first support member and disposing at least one shielding member on the folding axis of the hinge module adjacent to the magnetization region of the second support member, it is possible to reduce the performance degradation of the flexible display due to the magnetization region(s) of the first support member and/or the second support member.

In addition, various effects explicitly or implicitly appreciated through the disclosure may be provided.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1A:
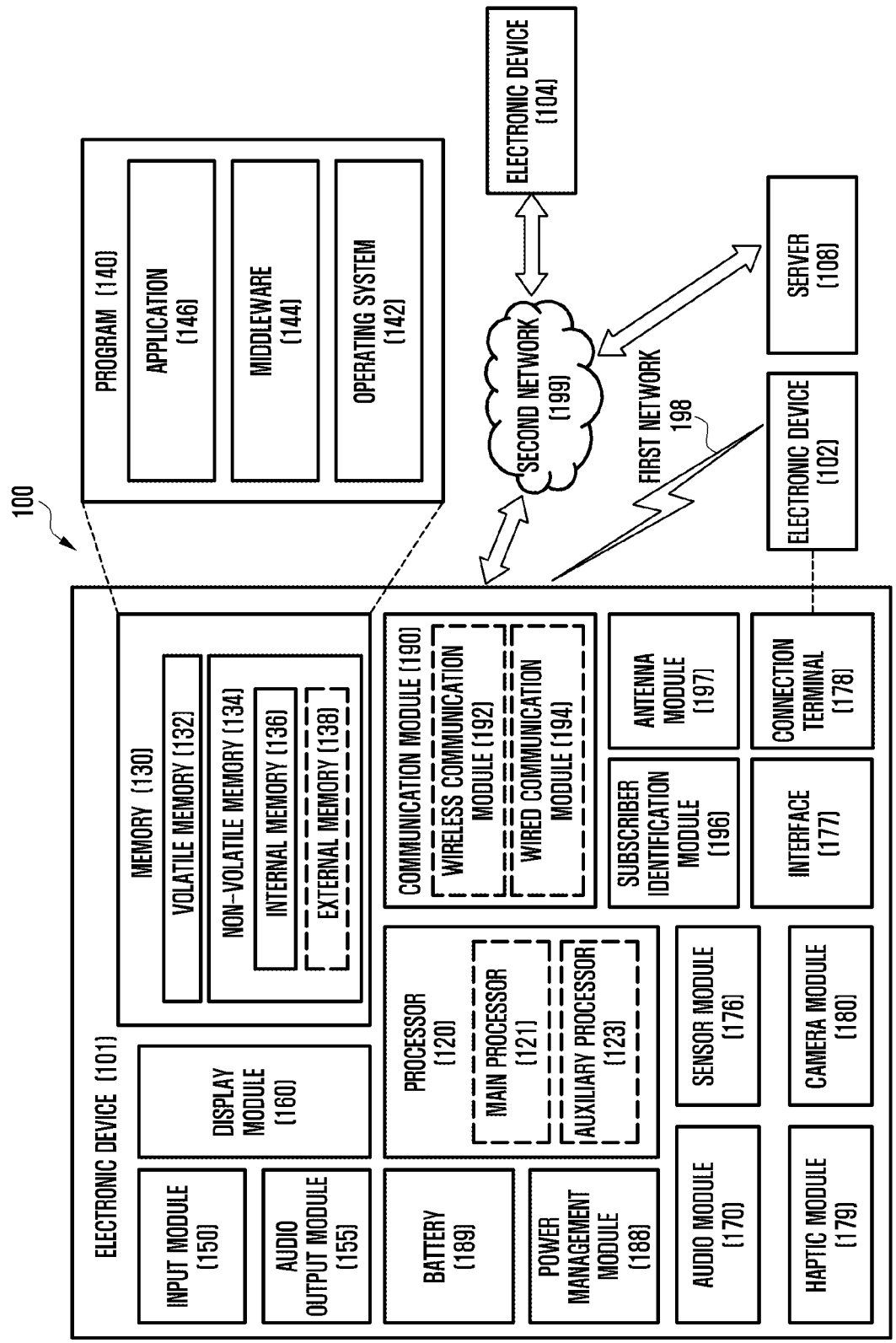
FIG. 1A is a block diagram illustrating an example electronic device in a network environment according to various embodiments.

FIG. 1A is a block diagram illustrating an example electronic device in a network environment according to various embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 1B:
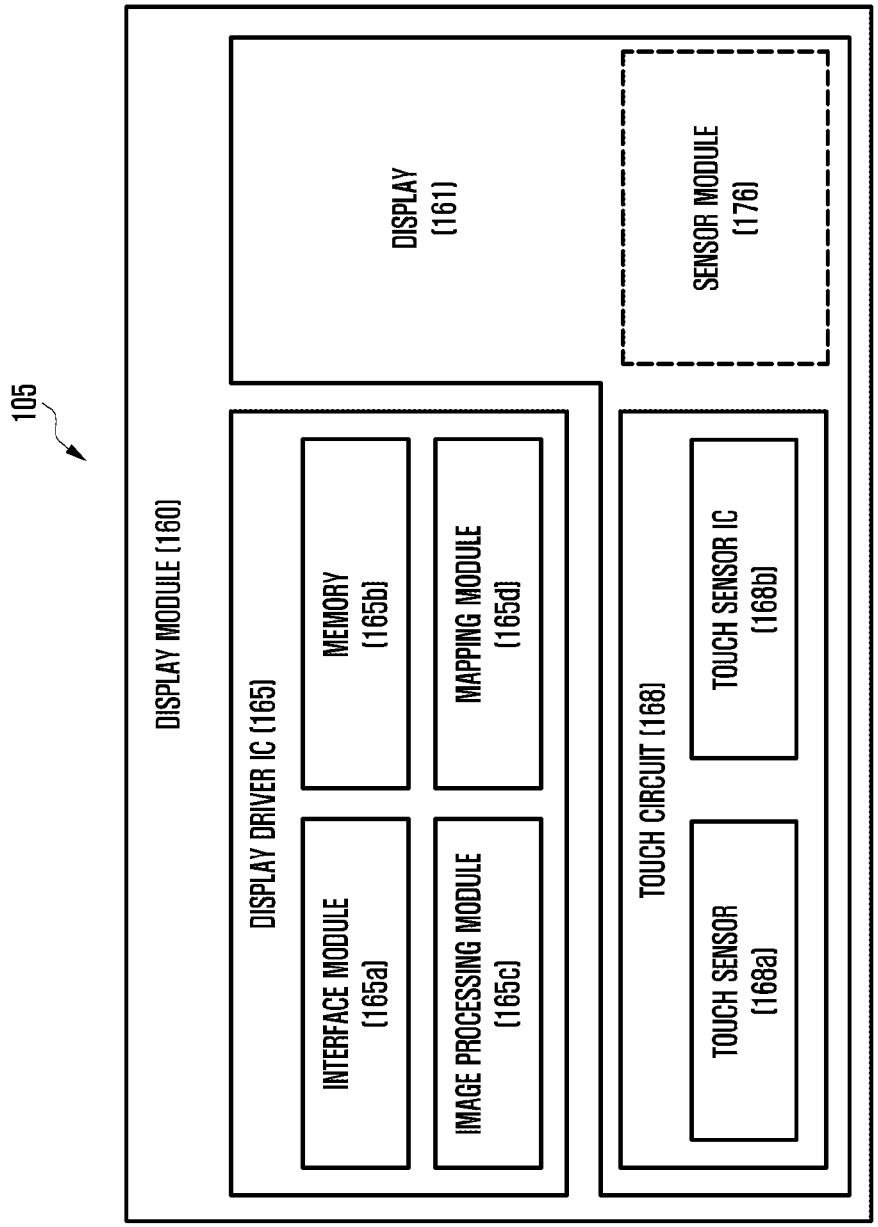
FIG. 1B is a block diagram illustrating an example configuration of a display module according to various embodiments.

FIG. 1B is a block diagram (105) illustrating an example configuration of an example display module (160) according to various embodiments. Referring to FIG. 1B, the display module 160 may include a display 161 and a display driver integrated circuit (DDI) 165 to control the display 161. The DDI 165 may include an interface module (e.g., including interface circuitry) 165a, memory 165b (e.g., buffer memory), an image processing module (e.g., including processing circuitry) 165c, and/or a mapping module (e.g., including various processing circuitry and/or executable program instructions) 165d. The DDI 165 may receive image information that contains image data or an image control signal corresponding to a command to control the image data from another component of the electronic device 101 via the interface module 165a. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 165 may communicate, for example, with touch circuitry 168 or the sensor module 176 via the interface module 165a. The DDI 165 may also store at least part of the received image information in the memory 165b, for example, on a frame by frame basis. The image processing module 165c may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 161. The mapping module 165d may generate a voltage value or a current value corresponding to the image data pre-processed or post-processed by the image processing module 165c. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 161 may be driven, for example, based at least in part on the voltage value or the current value such that visual information (e.g., a text, an image, or an icon) corresponding to the image data may be displayed via the display 161.

According to an embodiment, the display module 160 may further include touch circuitry 168. The touch circuitry 168 may include a touch sensor 168a and a touch sensor IC 168b to control the touch sensor 168a. The touch sensor IC

168b may control the touch sensor 168a to sense a touch input or a hovering input with respect to a certain position on the display 161. To achieve this, for example, the touch sensor 168a may detect (e.g., measure) a change in a signal (e.g., a voltage, a quantity of light, a resistance, or a quantity of one or more electric charges) corresponding to the certain position on the display 161. The touch circuitry 168 may provide input information (e.g., a position, an area, a pressure, or a time) indicative of the touch input or the hovering input detected via the touch sensor 168a to the processor 120. According to an embodiment, at least part (e.g., the touch sensor IC 168b) of the touch circuitry 168 may be formed as part of the display 161 or the DDI 165, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module (e.g., including at least one sensor) 176 or a control circuit for the at least one sensor. In such a case, the at least one sensor or the control circuit for the at least one sensor may be embedded in one portion of a component (e.g., the display 161, the DDI 165, or the touch circuitry 168)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 161. As another example, when the sensor module 176 embedded in the display module 160 includes a pressure sensor, the pressure sensor may obtain pressure information corresponding to a touch input received via a partial or whole area of the display 161. According to an embodiment, the touch sensor 168a or the sensor module 176 may be disposed between pixels in a pixel layer of the display 161, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
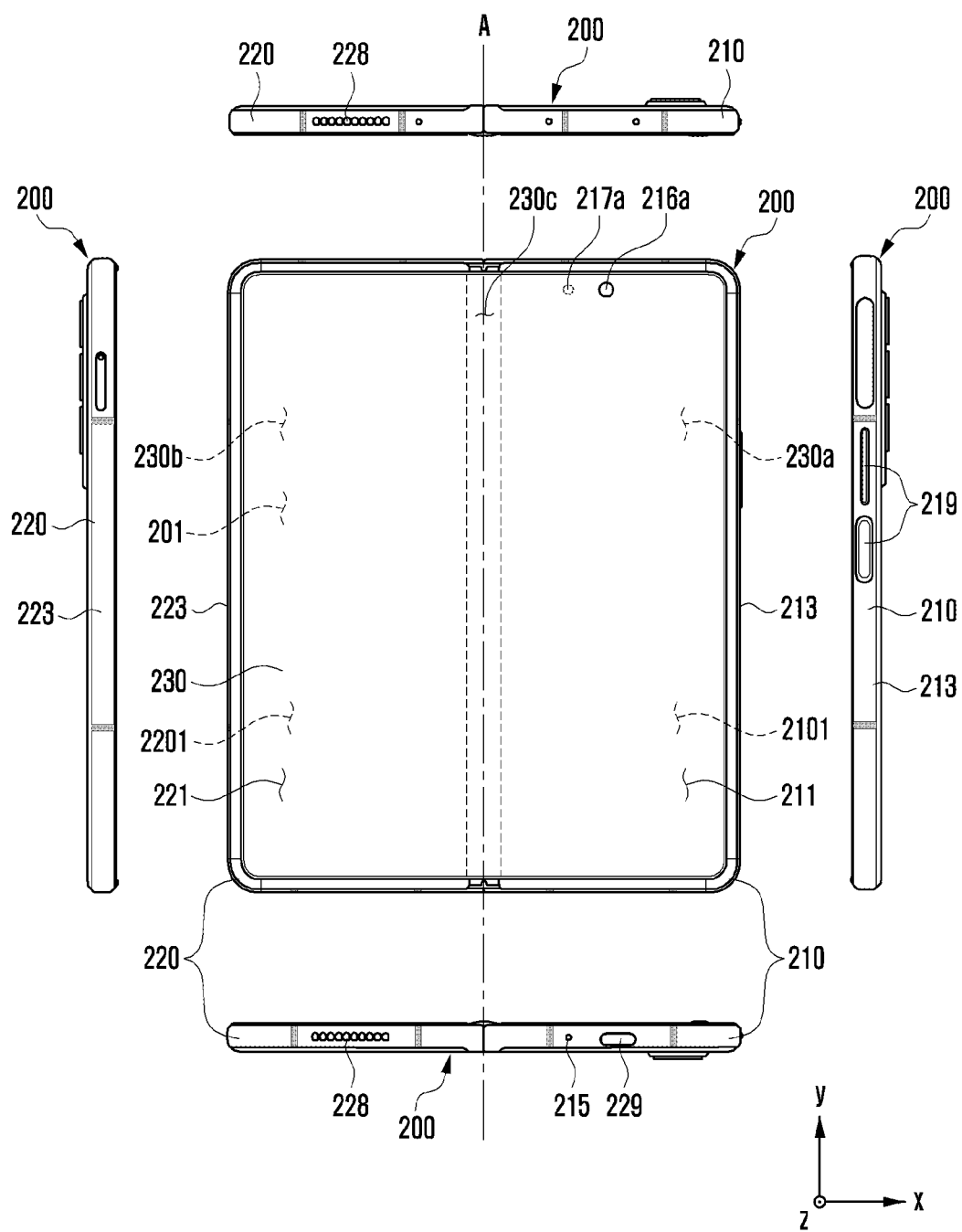
FIGS. 2A and 2B are diagrams illustrating front and rear views, respectively, of an unfolded state of an electronic device (e.g., a foldable electronic device) according to various embodiments.
Figure 2B:
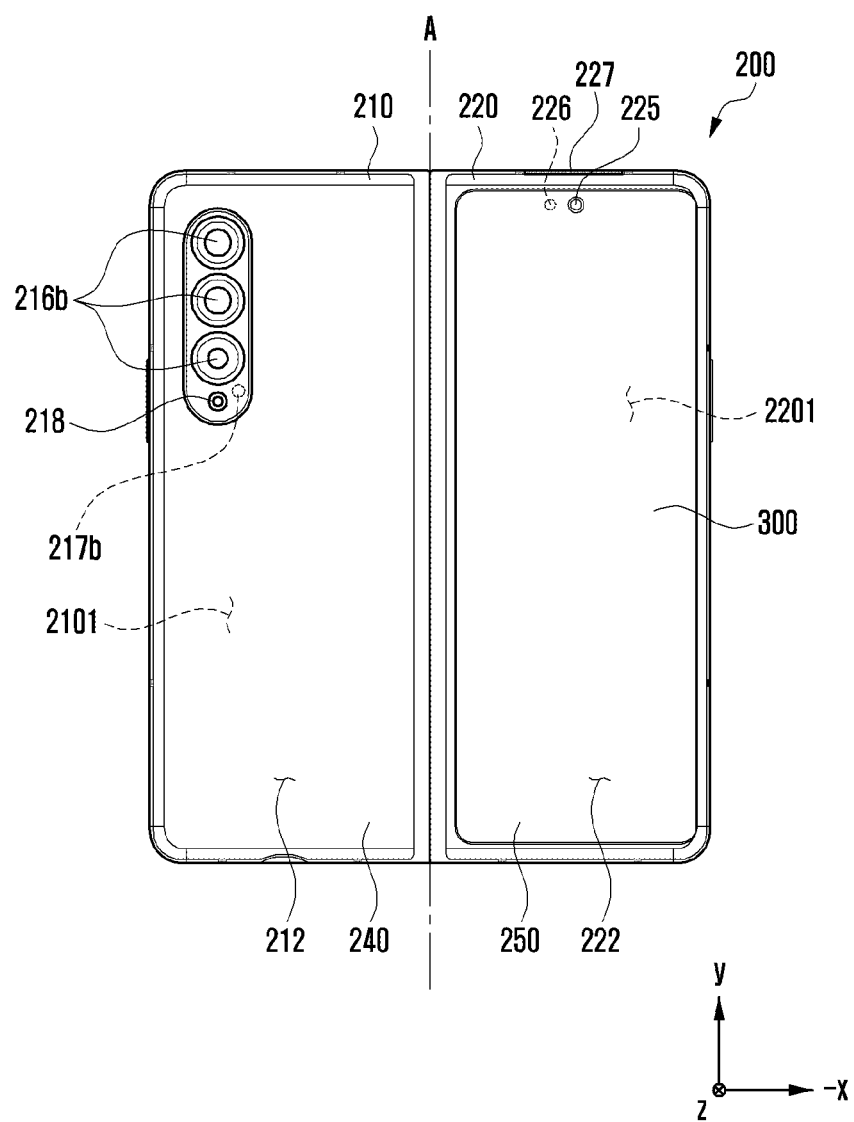
Figure 3A:
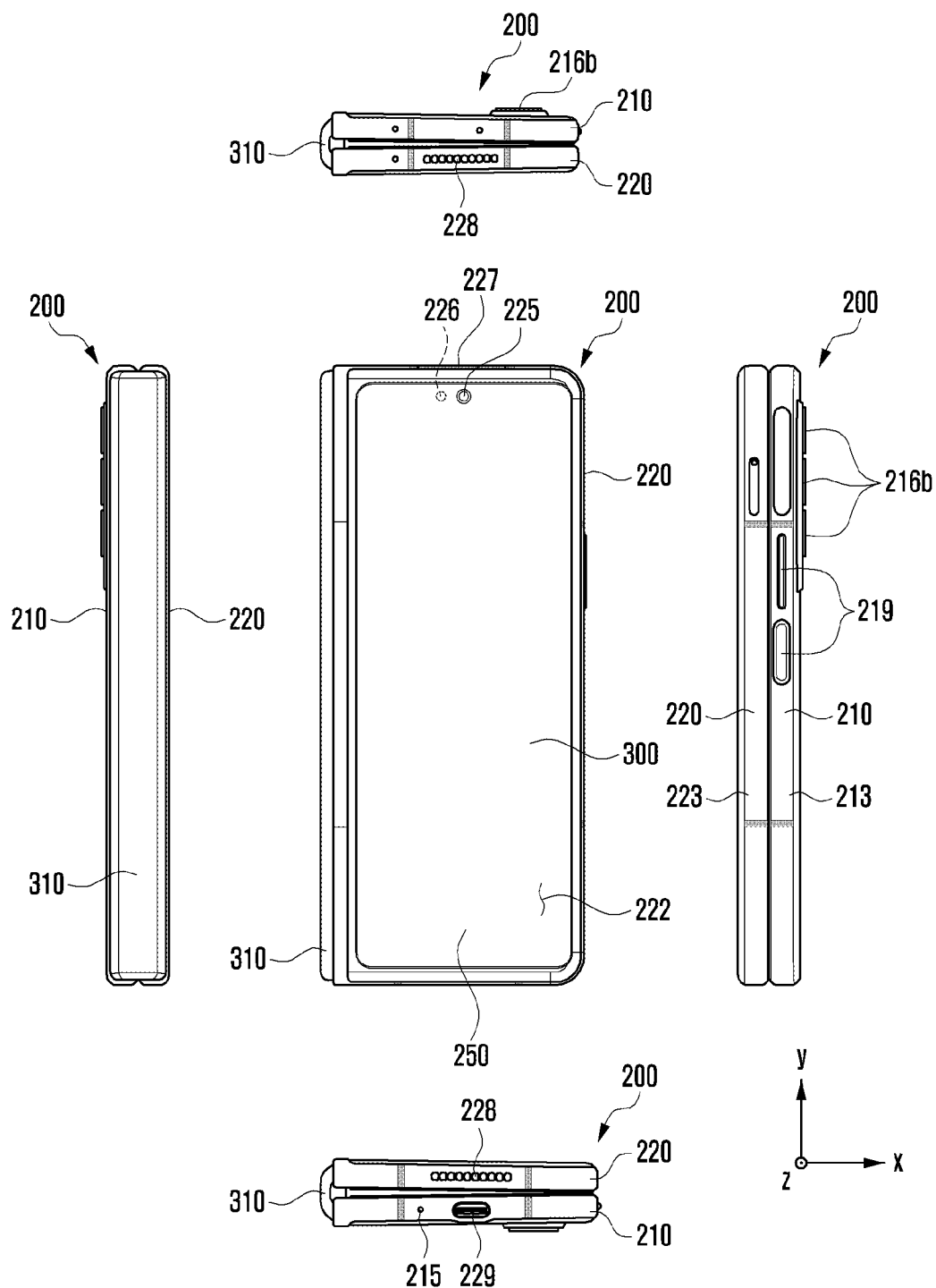
FIGS. 3A and 3B are diagrams illustrating front and rear views, respectively, of a folded state of an electronic device according to various embodiments.
Figure 3B:
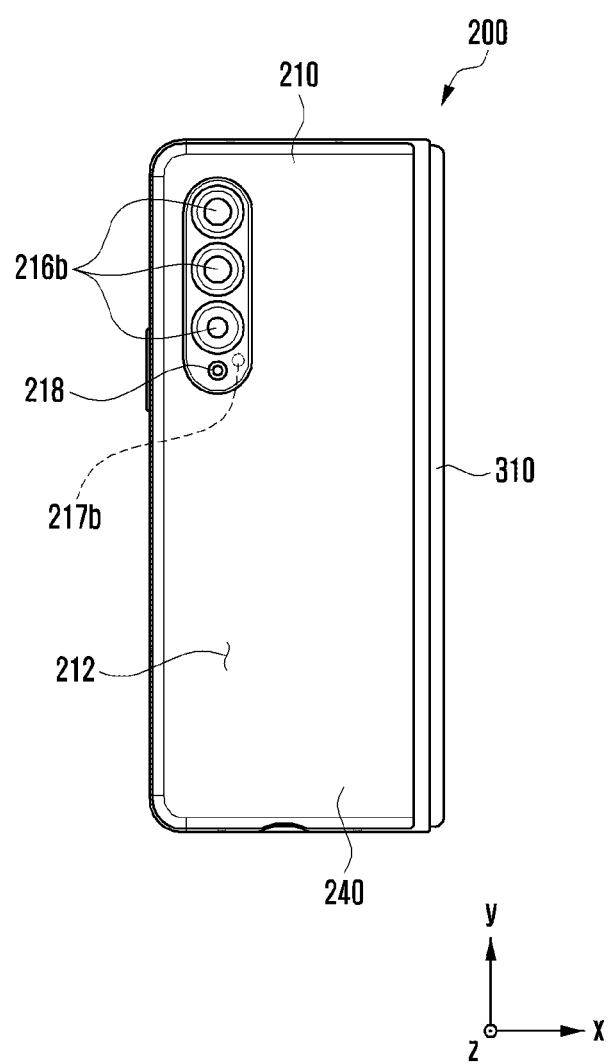

FIGS. 2A and 2B are diagrams illustrating front and rear views, respectively, of an unfolded state of an electronic device (e.g., a foldable electronic device) according to various embodiments. FIGS. 3A and 3B are diagrams illustrating front and rear views, respectively, illustrating a folded state of a foldable electronic device according to various embodiments.

According to various embodiments, the embodiments disclosed in FIGS. 1A and 1B may be included in the embodiments disclosed in FIGS. 2A, 2B, 3A and 3B (which may be referred to as FIGS. 2A to 3B). For example, the electronic device 200 illustrated in FIGS. 2A to 3B may include the processor 120, the memory 130, the input module 150, the sound output module 155, the display module 160, the audio module 170, the sensor module 176, the interface 177, the connection terminal 178, the haptic module 179, the camera module 180, the antenna module 197, and/or the subscriber identification module 196, which are illustrated in FIG. 1A. The electronic device shown in FIGS. 2A to 3B may include the foldable electronic device 200.

With reference to FIGS. 2A to 3B, the electronic device 200 (e.g., the foldable electronic device) according to various embodiments of the disclosure may include a pair of housings 210 and 220 (e.g., a foldable housing structure) rotatably coupled with respect to a folding axis A through a hinge device (e.g., a hinge plate 320 in FIG. 4A) (e.g., a hinge module) so as to be foldable with respect to each other, a flexible display 230 (e.g., a first display, a foldable display, or a main display) disposed through the pair of housings 210 and 220, and/or a sub-display 300 (e.g., a second display) disposed through the second housing 220.

According to various embodiments, the hinge device (e.g., the hinge plate 320 in FIG. 4A) may be disposed at least in part to be invisible from the outside through the first housing 210 and the second housing 220, and in the unfolding state (also referred to as an unfolded state), to be invisible from the outside through a hinge cover 310 (e.g., a hinge housing) that covers a foldable portion. In the disclosure, a surface on which the flexible display 230 is disposed may be defined as the front surface of the electronic device 200, and a surface opposite to the front surface may be defined as the rear surface of the electronic device 200. A surface surrounding a space between the front surface and the rear surface may be defined as a side surface of the electronic device 200.

Figure 4A:
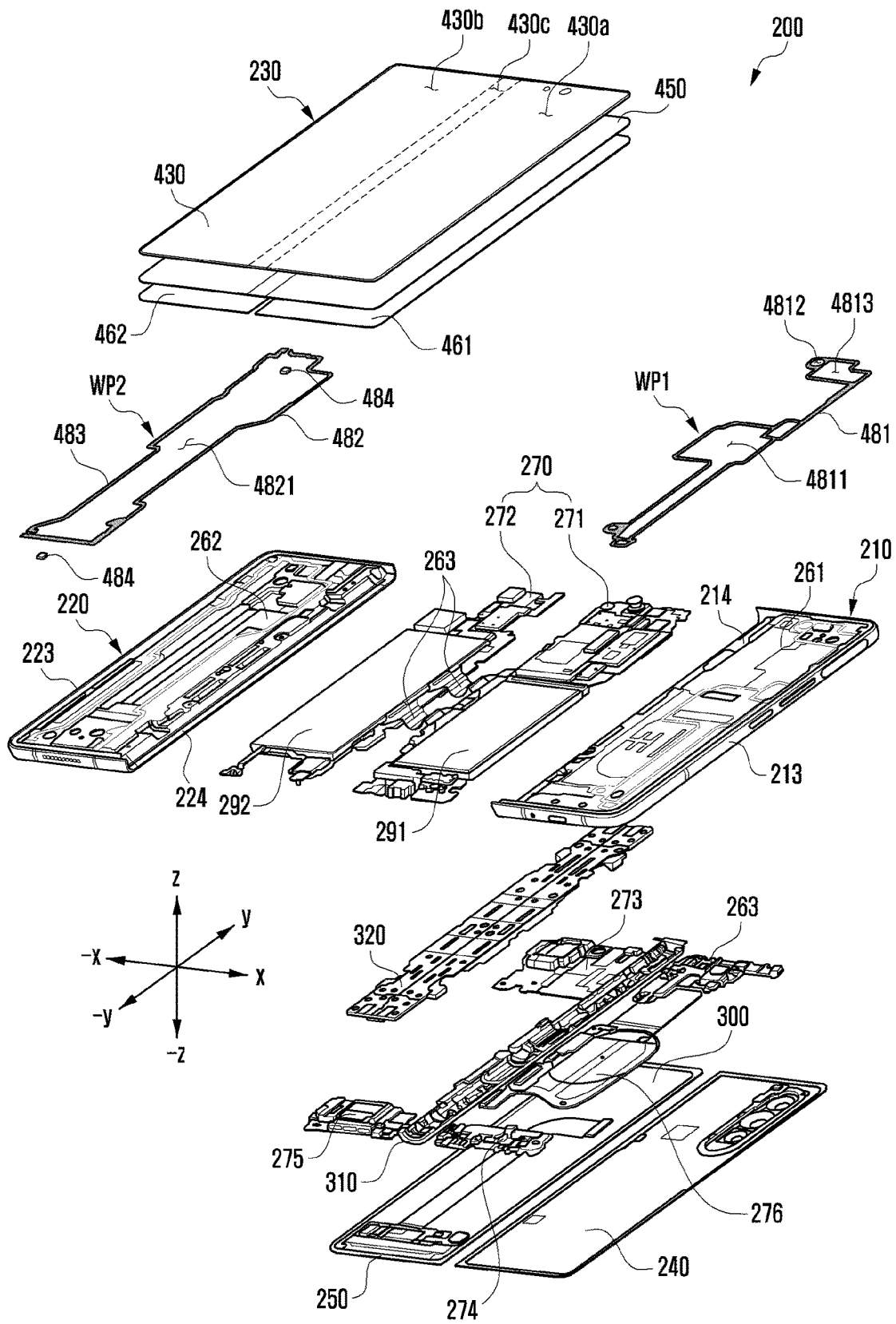
FIG. 4A is an exploded perspective view illustrating an electronic device according to various embodiments.

According to various embodiments, the pair of housings 210 and 220 may include a first housing 210 and a second housing 220, which are foldably disposed with respect to each other through the hinge device (e.g., the hinge plate 320 in FIG. 4A). Without being limited to the shape and combination shown in FIGS. 2A to 3B, the pair of housings 210 and 220 may be implemented with any other shape and/or any other combination of components. The first and second housings 210 and 220 may be disposed on both sides with respect to the folding axis A and may have an overall symmetrical shape with respect to the folding axis A. According to various embodiments, the first and second housings 210 and 220 may be folded asymmetrically with respect to the folding axis A. Depending on whether the electronic device 200 is in the unfolding state, the folding (also referred to as the folded state) state, or an intermediate state, the first and second housings 210 and 220 may have different angles or distances therebetween.

According to various embodiments, the first housing 210 is connected to the hinge device (e.g., the hinge plate 320 in FIG. 4A) in the unfolding state of the electronic device 200, and may have a first surface 211 disposed to face the front of the electronic device 200, a second surface 212 facing a direction opposite to the first surface 211, and/or a first side member 213 surrounding at least a portion of a first space between the first surface 211 and the second surface 212.

According to various embodiments, the second housing 220 is connected to the hinge device (e.g., the hinge plate 320 in FIG. 4A) in the unfolding state of the electronic device 200, and may have a third surface 221 disposed to face the front of the electronic device 200, a fourth surface 222 facing a direction opposite to the third surface 221, and/or a second side member 223 surrounding at least a portion of a second space between the third surface 221 and the fourth surface 222.

According to various embodiments, the first surface 211 faces substantially the same direction as the third surface 221 in the unfolding state, and at least partially faces the third surface 221 in the folding state.

According to various embodiments, the electronic device 200 may include a recess 201 formed to receive the flexible display 230 through structural coupling of the first and second housings 210 and 220. The recess 201 may have substantially the same size as the flexible display 230.

According to various embodiments, the hinge cover 310 (e.g., a hinge housing) may be disposed between the first housing 210 and the second housing 220. The hinge cover 310 may be disposed to cover a portion (e.g., at least one hinge module) of the hinge device (e.g., the hinge plate 320 in FIG. 4A). Depending on whether the electronic device 200 is in the unfolding state, the folding state, or the intermediate state, the hinge cover 310 may be covered by a portion of the first and second housings 210 and 220 or exposed to the outside.

According to various embodiments, when the electronic device 200 is in the unfolding state, at least a portion of the hinge cover 310 may be covered by the first and second housings 210 and 220 and thereby not be substantially exposed. When the electronic device 200 is in the folding state, at least a portion of the hinge cover 310 may be exposed to the outside between the first and second housings 210 and 220. In case of the intermediate state in which the first and second housings 210 and 220 are folded with a certain angle, the hinge cover 310 may be exposed at least in part to the outside of the electronic device 200 between the first and second housings 210 and 220. In this state, the area in which the hinge cover 310 is exposed to the outside may be smaller than that in the fully folding state. The hinge cover 310 may have at least in part a curved surface.

According to various embodiments, when the electronic device 200 is in the unfolding state (e.g., the state shown in FIGS. 2A and 2B), the first and second housings 210 and 220 may form an angle of about 180 degrees, and a first area 230a, a second area 230b, and a folding area 230c of the flexible display 230 may be disposed to form the same plane and to face substantially the same direction (e.g., the z-axis direction). In an embodiment, when the electronic device 200 is in the unfolding state, the first housing 210 may be rotated at an angle of about 360 degrees with respect to the second housing 220 and folded in the opposite direction so that the second surface 212 and the fourth surface 222 face each other (e.g., the out-folding style).

According to various embodiments, when the electronic device 200 is in the folding state (e.g., the state shown in FIGS. 3A and 3B), the first surface 211 of the first housing 210 and the third surface 221 of the second housing 220 may be disposed to face each other. In this case, the first area 230a and the second area 230b of the flexible display 230 may be disposed to face each other while forming a narrow angle (e.g., a range of 0 degrees to about 10 degrees) therebetween through the folding area 230c.

According to various embodiments, the folding area 230c may be deformed at least in part into a curved shape having a predetermined curvature. When the electronic device 200 is in the intermediate state, the first and second housings 210 and 220 may be disposed at a certain angle to each other. In this case, the first area 230a and the second area 230b of the flexible display 230 may form an angle greater than in the folding state and smaller than in the unfolding state, and the curvature of the folding area 230c may be smaller than in the folding state and greater than in the unfolding state.

According to various embodiments, the first and second housings 210 and 220 may stop (e.g., a free stop function) at an angle designated between the folding state and the unfolding state through the hinge device (e.g., the hinge plate 320 in FIG. 4A). In various embodiments, the first and second housings 210 and 220 may be continuously operated at designated inflection angles through the hinge device (e.g., the hinge plate 320 in FIG. 4A) while being pressed in the unfolding direction or the folding direction.

According to various embodiments, the electronic device 200 may include at least one of at least one display (e.g., the flexible display 230 and the sub-display 300), an input device 215, sound output devices 227 and 228, sensor modules 217a, 217b, and 226, camera modules 216a, 216b, and 225, a key input device 219, an indicator (not shown), and a connector port 229, which are disposed in the first housing 210 and/or the second housing 220. In various embodiments, the electronic device 200 may omit at least one of the above-described components or further include other components.

According to various embodiments, the at least one display (e.g., the flexible display 230 and the sub-display 300) may include the flexible display 230 (e.g., the first display) supported through the first surface 211 of the first housing 210, the hinge device (e.g., the hinge plate 320 in FIG. 4A), and the third surface 221 of the second housing 220, and the sub-display 300 (e.g., the second display) disposed to be visible at least in part to the outside through the fourth surface 222 in an inner space of the second housing 220. In various embodiments, the sub-display 300 may be disposed to be visible to the outside through the second surface 212 in an inner space of the first housing 210. According to an embodiment, the flexible display 230 may be mainly used in the unfolding state of the electronic device 200, and the sub-display 300 may be mainly used in the folding state of the electronic device 200. According to an embodiment, in case of the intermediate state, the electronic device 200 may control the flexible display 230 and/or the sub-display 300 to be useable, based on the folding angles between the first and second housings 210 and 220.

According to various embodiments, the flexible display 230 may be disposed in an accommodation space formed by the pair of housings 210 and 220. For example, the flexible display 230 may be disposed in the recess 201 formed by the pair of housings 210 and 220, and in the unfolding state, arranged to occupy substantially most of the front surface of the electronic device 200. According to an embodiment, the flexible display 230 may be changed in shape to a flat surface or a curved surface in at least a partial area. The flexible display 230 may have a first area 230a facing the first housing 210, a second area 230b facing the second housing 220, and a folding area 230c connecting the first area 230a and the second area 230b and facing the hinge device (e.g., the hinge plate 320 in FIG. 4A). According to an embodiment, the area division of the flexible display 230 is only an example physical division by the pair of housings 210 and 220 and the hinge device (e.g., the hinge plate 320 in FIG. 4A), and substantially the flexible display 230 may be realized as one seamless full screen over the pair of housings 210 and 220 and the hinge device (e.g., the hinge plate 320 in FIG. 4A). The first area 230a and the second area 230b may have an overall symmetrical shape or a partially asymmetrical shape with respect to the folding area 230c.

According to various embodiments, the electronic device 200 may include a first rear cover 240 disposed on the second surface 212 of the first housing 210 and a second rear cover 250 disposed on the fourth surface 222 of the second housing 220. In various embodiments, at least a portion of the first rear cover 240 may be integrally formed with the first side member 213. In various embodiments, at least a portion of the second rear cover 250 may be integrally formed with the second side member 223. According to an embodiment, at least one of the first rear cover 240 and the second rear cover 250 may be formed with a substantially transparent plate (e.g., a glass plate having various coating layers, or a polymer plate) or an opaque plate.

According to various embodiments, the first rear cover 240 may be formed with an opaque plate such as, for example, coated or colored glass, ceramic, polymer, metal (e.g., aluminum, stainless steel (STS), or magnesium), or any combination thereof. The second rear cover 250 may be formed with a substantially transparent plate such as glass or polymer, for example. In this case, the second display 300 may be disposed to be visible from the outside through the second rear cover 250 in the inner space of the second housing 220.

According to various embodiments, the input device 215 may include a microphone. In various embodiments, the input device 215 may include a plurality of microphones arranged to detect the direction of sound.

According to various embodiments, the sound output devices 227 and 228 may include speakers. According to an embodiment, the sound output devices 227 and 228 may include a receiver 227 for a call disposed through the fourth surface 222 of the second housing 220, and an external speaker 228 disposed through at least a portion of the second side member 223 of the second housing 220. In various embodiments, the input device 215, the sound output devices 227 and 228, and the connector 229 may be disposed in spaces of the first housing 210 and/or the second housing 220 and exposed to the external environment through at least one hole formed in the first housing 210 and/or the second housing 220. In various embodiments, the holes formed in the first housing 210 and/or the second housing 220 may be commonly used for the input device 215 and the sound output devices 227 and 228. In various embodiments, the sound output devices 227 and 228 may include a speaker (e.g., a piezo speaker) that is operated without holes formed in the first housing 210 and/or the second housing 220.

According to various embodiments, the camera modules 216a, 216b, and 225 may include a first camera module 216a disposed on the first surface 211 of the first housing 210, a second camera module 216b disposed on the second surface 212 of the first housing 210, and/or a third camera module 225 disposed on the fourth surface 222 of the second housing 220. According to an embodiment, the electronic device 200 may include a flash 218 disposed near the second camera module 216b. The flash 218 may include, for example, a light emitting diode or a xenon lamp. According to an embodiment, the camera modules 216a, 216b, and 225 may include one or more lenses, an image sensor, and/or an image signal processor. In various embodiments, at least one of the camera modules 216a, 216b, and 225 may include two or more lenses (e.g., wide-angle and telephoto lenses) and image sensors and may be disposed together on one surface of the first housing 210 and/or the second housing 220.

According to various embodiments, the sensor modules 217a, 217b, and 226 may generate an electrical signal or data value corresponding to an internal operating state of the electronic device 200 or an external environmental state. According to an embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In various embodiments, the sensor modules 217a, 217b, and 226 may include at least one of a gesture sensor, a grip sensor, a color sensor, an infrared (IR) sensor, an illumination sensor, an ultrasonic sensor, an iris recognition sensor, or a distance detection sensor (e.g., a time of flight (TOF) sensor or a light detection and ranging (LiDAR)).

According to various embodiments, the electronic device 200 may further include an unillustrated sensor module, for example, at least one of a barometric pressure sensor, a magnetic sensor, a biometric sensor, a temperature sensor, a humidity sensor, or a fingerprint recognition sensor. In various embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In various embodiments, the key input device 219 may be disposed to be exposed to the outside through the second side member 223 of the second housing 220. In various embodiments, the electronic device 200 may not include some or all of the key input devices 219, and the non-included key input device may be implemented in another form, such as a soft key, on at least one of the displays 230 and 300. In an embodiment, the key input device 219 may be implemented using a pressure sensor included in at least one of the displays 230 and 300.

According to various embodiments, the connector port 229 may include a connector (e.g., a USB connector or an interface connector port module (IF module)) for transmitting and receiving power and/or data to and from an external electronic device (e.g., the external electronic device 102, 104, or 108 in FIG. 1A). In various embodiments, the connector port 229 may also perform a function of transmitting and receiving an audio signal to and from an external electronic device or further include a separate connector port (e.g., an ear jack hole) for performing the function of audio signal transmission and reception.

According to various embodiments, at least one 216a, 225 of the camera modules 216a, 216b, and 225, at least one 217a, 226 of the sensor modules 217a, 217b, and 226, and/or the indicator may be arranged to be exposed through at least one of the displays 230 and 300. For example, the at least one camera module 216a and/or 225, the at least one sensor module 217a and/or 226, and/or the indicator may be disposed under an active area (display area) of at least one of the displays 230 and 300 in the inner space of at least one of the housings 210 and 220 so as to be in contact with the external environment through a transparent region or an opening perforated up to a cover member (e.g., a window layer (not shown) of the flexible display 230 and/or the second rear cover 250). According to an embodiment, a region where the display 230 or 300 and the camera module 216a or 225 face each other is a part of the display area and may be formed as a transmissive region having a certain transmittance. According to an embodiment, the transmissive region may be formed to have a transmittance in a range of about 5% to about 20%. The transmissive region may have an area that overlaps with an effective area (e.g., an angle of view area) of the camera module 216a or 225 through which light for generating an image at an image sensor passes. For example, the transmissive region of the at least one display 230 and/or 300 may have an area having a lower density of pixels than the surrounding area. For example, the transmissive region may replace the opening. For example, the at least one camera module 216a and/or 225 may include an under display camera (UDC) or an under panel camera (UPC). In an embodiment, some camera modules or sensor modules 217a and 226 may be disposed to perform their functions without being visually exposed through the display. For example, a region facing the camera modules 216a and 225 and/or the sensor modules 217a and 226 disposed under the at least one display 230 and/or 300 (e.g., a display panel) has an under display camera (UDC) structure that may not require a perforated opening.

Figure 4B:
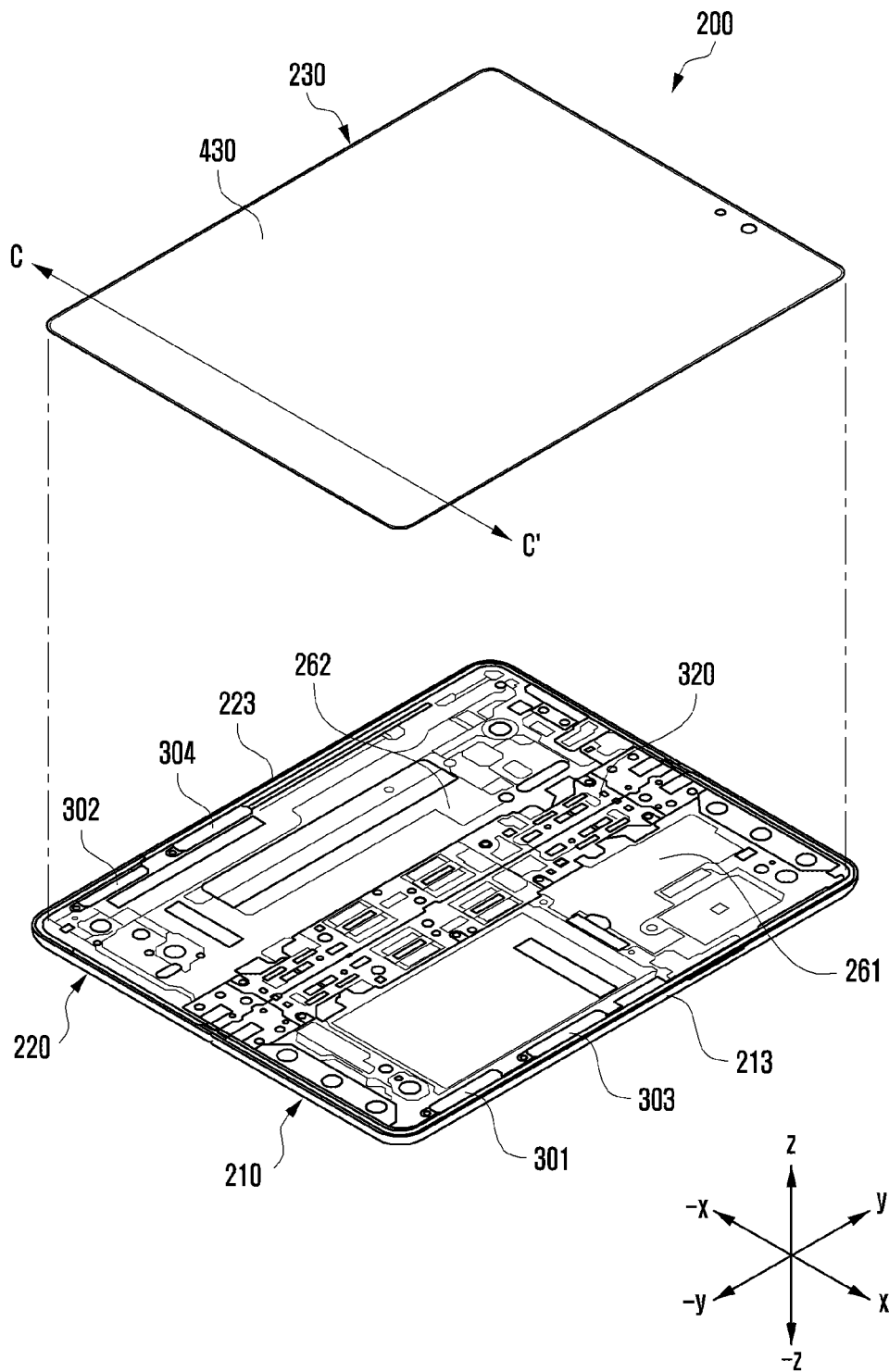
FIG. 4B is an exploded perspective view illustrating a flexible display of an electronic device before the flexible display is disposed on first and second housings according to various embodiments.

FIG. 4A is an exploded perspective view illustrating an electronic device according to various embodiments. FIG. 4B is an exploded perspective view illustrating an example electronic device before a flexible display is disposed on first and second housings according to various embodiments.

With reference to FIG. 4A, the electronic device 200 may include a flexible display 230 (e.g., a first display), a sub-display 300 (e.g., a second display), a hinge plate 320, a pair of support members (e.g., a first support member 261, a second support member 262), at least one substrate 270 (e.g., a printed circuit board (PCB)), a first housing 210, a second housing 220, a first rear cover 240, and/or a second rear cover 250.

According to various embodiments, the flexible display 230 may include a display panel 430 (e.g., a flexible display panel), a support plate 450 disposed under (e.g., in the negative z-axis direction) the display panel 430, and a pair of metal plates 461 and 462 disposed under (e.g., in the negative z-axis direction) the support plate 450.

According to various embodiments, the display panel 430 may include a first panel area 430a corresponding to a first area (e.g., the first area 230a in FIG. 2A) of the flexible display 230, a second panel area 430b extending from the first panel area 430a and corresponding to a second area (e.g., the second area 230b in FIG. 2A) of the flexible display 230, and a third panel area 430c connecting the first panel area 430a and the second panel area 430b and corresponding to a folding area (e.g., the folding area 230c in FIG. 2A) of the flexible display 230.

According to various embodiments, the support plate 450 may be disposed between the display panel 430 and the pair of support members 261 and 262 and formed to have a material and shape for providing a planar support structure for the first and second panel areas 430a and 430b and providing a bendable structure to aid in flexibility of the third panel region 430c. According to an embodiment, the support plate 450 may be formed of a conductive material (e.g., metal) or a non-conductive material (e.g., polymer or fiber reinforced plastics (FRP)). According to an embodiment, the pair of metal plates 461 and 462 may include a first metal plate 461 disposed to correspond to at least a portion of the first and third panel areas 430a and 430c between the support plate 450 and the pair of support members 261 and 262, and a second metal plate 462 disposed to correspond to at least a portion of the second and third panel areas 430b and 430c. According to an embodiment, the pair of metal plates 461 and 462 may be formed of a metal material (e.g., SUS), thereby helping to reinforce a ground connection structure and rigidity for the flexible display 230.

According to various embodiments, the sub-display 300 may be disposed in a space between the second housing 220 and the second rear cover 250. According to an embodiment, the sub-display 300 may be disposed to be visible from the outside through substantially the entire area of the second rear cover 250 in the space between the second housing 220 and the second rear cover 250.

According to various embodiments, at least a portion of the first support member 261 may be foldably combined with the second support member 262 through the hinge plate 320. According to an embodiment, the electronic device 200 may include at least one wiring member 263 (e.g., a flexible printed circuit board (FPCB)) disposed from at least a portion of the first support member 261 to a portion of the second support member 262 across the hinge plate 320. According to an embodiment, the first support member 261 may be disposed in such a way that it extends from the first side member 213 or is structurally combined with the first side member 213. According to an embodiment, the electronic device 200 may have a first space (e.g., the first space 2101 in FIG. 2A) provided through the first support member 261 and the first rear cover 240.

According to various embodiments, the first housing 210 (e.g., a first housing structure) may be configured through a combination of the first side member 213, the first support member 261, and the first rear cover 240. According to an embodiment, the second support member 262 may be disposed in such a way that it extends from the second side member 223 or is structurally combined with the second side member 223. According to an embodiment, the electronic device 200 may have a second space (e.g., the second space 2201 in FIG. 2A) provided through the second support member 262 and the second rear cover 250.

According to various embodiments, the second housing 220 (e.g., a second housing structure) may be configured through a combination of the second side member 223, the second support member 262, and the second rear cover 250. According to an embodiment, at least a portion of the at least one wiring member 263 and/or the hinge plate 320 may be disposed to be supported through at least a portion of the pair of support members 261 and 262. According to an embodiment, the at least one wiring member 263 may be disposed in a direction (e.g., the x-axis direction) that crosses the first and second support members 261 and 262. According to an embodiment, the at least one wiring member 263 may be disposed in a direction (e.g., the x-axis direction) substantially perpendicular to the folding axis (e.g., the y-axis or the folding axis A in FIG. 2A).

According to various embodiments, the at least one substrate 270 may include a first substrate 271 disposed in the first space 2101 and a second substrate 272 disposed in the second space 2201. According to an embodiment, the first substrate 271 and the second substrate 272 may include at least one electronic component disposed to implement various functions of the electronic device 200. According to an embodiment, the first substrate 271 and the second substrate 272 may be electrically connected to each other through the at least one wiring member 263.

According to various embodiments, the electronic device 200 may include at least one battery 291 and 292. According to an embodiment, the at least one battery 291 and 292 may include a first battery 291 disposed in the first space 2101 of the first housing 210 and electrically connected to the first substrate 271, and a second battery 292 disposed in the second space 2201 of the second housing 220 and electrically connected to the second substrate 272. According to an embodiment, the first and second support members 261 and 262 may further have at least one swelling hole for the first and second batteries 291 and 292.

According to various embodiments, the first housing 210 may have a first rotation support surface 214, and the second housing 220 may have a second rotation support surface 224 corresponding to the first rotation support surface 214. According to an embodiment, the first and second rotation support surfaces 214 and 224 may have curved surfaces corresponding to the curved outer surface of the hinge cover 310. According to an embodiment, when the electronic device 200 is in the unfolding state, the first and second rotational support surfaces 214 and 224 may cover the hinge cover 310 so as not to expose or so as to partially expose the hinge cover 310 to the rear surface of the electronic device 200. According to an embodiment, when the electronic device 200 is in the folding state, the first and second rotational support surfaces 214 and 224 may rotate along the curved outer surface of the hinge cover 310 and thereby expose at least in part the hinge cover 310 to the rear surface of the electronic device 200.

According to various embodiments, the electronic device 200 may include at least one antenna 276 disposed in the first space 2201. According to an embodiment, the at least one antenna 276 may be disposed between the first battery 291 and the first rear cover 240 in the first space 2201. According to an embodiment, the at least one antenna 276 may include, for example, a near field communication (NFC) antenna, a wireless charging antenna, and/or a magnetic secure transmission (MST) antenna. According to an embodiment, the at least one antenna 276 may perform short-range communication with an external device or wirelessly transmit/receive power required for charging, for example. In various embodiments, the antenna structure may be formed by at least a portion of the first side member 213 or the second side member 223, a portion of the first and second support members 261 and 262, or a combination thereof.

According to various embodiments, the electronic device 200 may further include one or more electronic component assemblies 274 and 275 and/or additional support members 263 and 273 disposed in the first space 2101 and/or the second space 2201. For example, the one or more electronic component assemblies 274 and 275 may include an interface connector port assembly 274 and/or a speaker assembly 275.

According to various embodiments, the electronic device 200 may include a first waterproof structure WP1 disposed between the first metal plate 461 and the first support member 261 and a second waterproof structure WP2 disposed between the second metal plate 462 and the second support member 262. According to an embodiment, the first waterproof structure WP1 may include a first waterproof member 481 disposed to form at least one first waterproof space 4811, 4812, and/or 4813 between the first metal plate 461 and the first support member 261. According to an embodiment, the second waterproof structure WP2 may include a second waterproof member 482, a third waterproof member 483, and a fourth waterproof member 484 disposed to form at least one second waterproof space 4821 between the second metal plate 462 and the second support member 262. According to an embodiment, the fourth waterproof member 484 may be disposed to connect a space stepped, spaced apart from the second and third waterproof members 482 and 483.

According to various embodiments, the at least one first waterproof space 4811 may be disposed through the first waterproof member 481 to accommodate a through-path of a cable member (e.g., FPCB) that is a wiring structure for connecting an electronic component (e.g., the first digitizer 521 in FIG. 5) disposed between the first metal plate 461 and the first support member 262 to the first space 2101. According to an embodiment, the at least one second waterproof space 4821 may be disposed through the second, third, and fourth waterproof members 482, 483, and 484 to accommodate a through-path of a cable member (e.g., FPCB) that is a wiring structure for connecting an electronic component (e.g., the second digitizer 522 in FIG. 5) disposed between the second metal plate 462 and the second support member 262 to the second space 2201. According to an embodiment, the at least one first waterproof space 4812 and/or 4813 may accommodate an area corresponding to at least one electronic component (e.g., a camera module or a sensor module) disposed to be supported by the first support member 261.

As such, the electronic device 200 according to embodiments of the disclosure includes the at least one waterproof structure WP1 and/or WP2 in which the at least one waterproof member 481, 482, 483, and/or 484 is disposed between the first support member 261 of the first housing 210 and the first metal plate 461 and/or between the second support member 262 of the second housing 220 and the second metal plate 462. Therefore, when the flexible display 230 is separated from the pair of housings 210 and 220 for maintenance of the electronic device 200, a phenomenon that the flexible display 230 is damaged may be reduced through the at least one waterproof member 481, 482, 483, and/or 484. In addition, because the at least one waterproof member 481, 482, 483, and/or 484 is disposed avoiding the rear surface of the flexible display 230, it may improve an external visibility and ensure a surface quality.

Referring to FIG. 4B, in the electronic device 200 according to various embodiments of the disclosure, the flexible display 230 may be disposed above (e.g., in the z-axis direction) the first support member 261 (e.g., the first housing 210), the hinge plate 320, and the second support member 262 (e.g., the second housing 220).

According to various embodiments, the flexible display 230 may be disposed above (e.g., in the z-axis direction) and supported by the first support member 261, the hinge plate 320, and the second support member 262. The edge of the flexible display 230 may be surrounded by the first side member 213 of the first housing 210 and the second side member 223 of the second housing 220.

According to various embodiments, at least one magnet 301 and 303 may be disposed inside the first side member 213. According to an embodiment, the at least one magnet 301 and 303 may include, between the first side member 213 and the first support member 261, a first magnet 301 disposed relatively in a first direction (e.g., the negative y-axis direction) and a third magnet 303 disposed relatively in a second direction (e.g., the y-axis direction).

According to various embodiments, at least one magnet 302 and 304 may be disposed inside the second side member 223. According to an embodiment, the at least one magnet 302 and 304 may include, between the second side member 223 and the second support member 262, a second magnet 302 disposed relatively in the first direction (e.g., the negative y-axis direction) and a fourth magnet 304 disposed relatively in the second direction (e.g., the y-axis direction).

According to various embodiments, when the electronic device 200 is in the folding state, the first magnet 301 and the second magnet 302 may be coupled by a magnetic force, and the third magnet 303 and the fourth magnet 304 may be coupled by a magnetic force.

Figure 5:
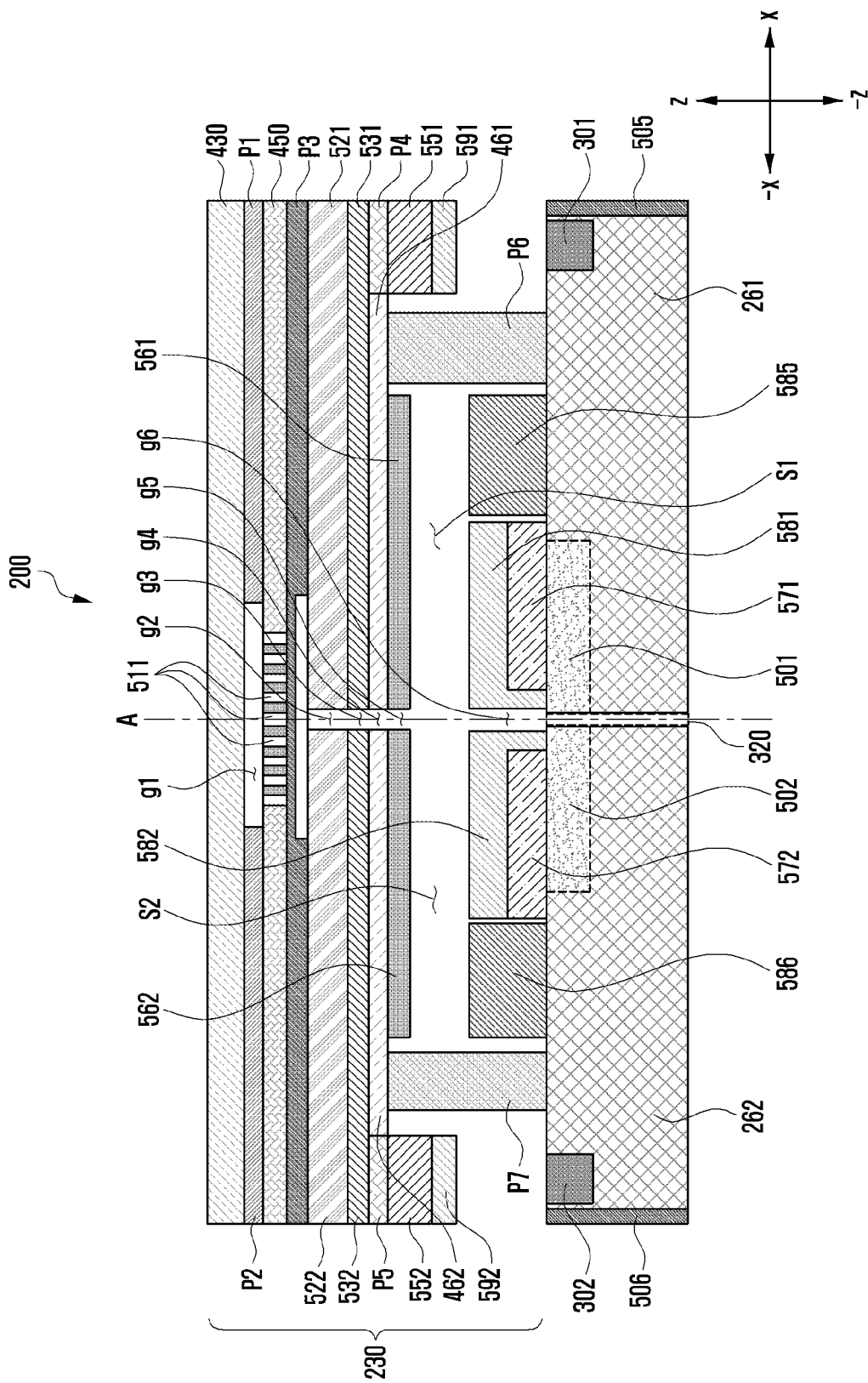
FIG. 5 is a cross-sectional view illustrating a portion of the flexible display of the electronic device, after the flexible display is disposed on the first and second housings, illustrated in FIG. 4B taken along the line C-C' according to various embodiments.

FIG. 5 is a cross-sectional view illustrating a portion of the flexible display of the electronic device, after the flexible display is disposed on the first and second housings, illustrated in FIG. 4B taken along the line C-C' according to various embodiments.

According to various embodiments, the foldable electronic device 200 illustrated in FIG. 5 may include the example arrangements illustrated in FIGS. 1A, 1B, 2A, 2B, 3A, 3B, 4A and 4B (which may be referred to as FIGS. 1A to 4B).

In the following description of embodiments, the same reference numerals are assigned to components substantially the same as or similar to those of the above-described embodiments shown in FIGS. 1A to 4B, and overlapping descriptions of their functions may not be repeated.

With reference to FIG. 5, the foldable electronic device 200 according to various embodiments of the disclosure may include the first support member 261 (e.g., the first housing 210) and the second support member 262 (e.g., the second housing 220) that are foldable to face each other based on the hinge plate 320 (e.g., the hinge plate 320 in FIG. 4A or 4B) (e.g., with respect to the folding axis A). In the foldable electronic device 200, the flexible display 230 may be disposed on upper surfaces (e.g., the first surface in the z-axis direction) of the first and second support members 261 and 262. The flexible display 230 may be disposed to be supported by at least a portion of the first housing 210, at least a portion of the second housing 220, and the hinge plate 320.

According to an embodiment, the first support member 261 (e.g., the first support member 261 in FIG. 4B) may be combined at least in part with a first side (e.g., in the x-axis direction) of the hinge plate 320. The second support member 262 (e.g., the second support member 262 in FIG. 4B) may be combined at least in part with a second side (e.g., in the negative x-axis direction) of the hinge plate 320. The first and second support members 261 and 262 may be configured to enable the unfolding state and/or the folding state based on the hinge plate 320 (e.g., the axis A). The flexible display 230 may be supported on the first and second support members 261 and 262 and be unfolded or folded through the hinge plate 320 depending on the unfolding state or folding state of the first and second support members 261 and 262.

According to an embodiment, the first magnet 301 may be disposed on an upper surface (e.g., a first surface in the z-axis direction) of an edge of the first support member 261 in a first direction (e.g., the x-axis direction). The second magnet 302 may be disposed on an upper surface (e.g., a first surface in the z-axis direction) of an edge of the second support member 262 in a second direction (e.g., the negative x-axis direction). When the foldable electronic device 200 is folded, the first magnet 301 and the second magnet 302 may be coupled by a magnetic force.

According to various embodiments, as described with reference to FIG. 4B, for example, the first magnet 301 may be disposed between the first side member 213 and the first support member 261. The second magnet 302 may be disposed between the second side member 223 and the second support member 262.

According to various embodiments, in the first support member 261, a first magnetization region 501 may be formed adjacent to the folding axis A of the hinge plate 320 by an external magnetic force. According to an embodiment, the first side of the hinge plate 320 connected to at least a portion of the first support member 261 may also be magnetized by an external magnetic force. In the second support member 262, a second magnetization region 502 may be formed adjacent to the folding axis A of the hinge plate 320 by an external magnetic force. According to an embodiment, the second side of the hinge plate 320 connected to at least a portion of the second support member 262 may also be magnetized by an external magnetic force. According to an embodiment, in case that the first support member 261, the second support member 262, and the hinge plate 320 are formed of a conductive material (e.g., metal), the first support member 261, the second support member 261, and the hinge plate 320 may be magnetized by an external magnet. In an embodiment, the first magnetization region 501 and the second magnetization region 502 may be formed by a magnet existing in a handbag or bag of a user of the foldable electronic device 200.

According to an embodiment, the foldable display 230 (e.g., the display module 160 in FIG. 1B) may include a display panel 430, a support plate 450, a first digitizer 521, a second digitizer 522, a first-first shielding member 531, a first-second shielding member 532, a first metal plate 461, a second metal plate 462, a second-first shielding member 551, a second-second shielding member 552, a first heat dissipation member 561, a second heat dissipation member 562, a third-first shielding member 571, a third-second shielding member 572, a fourth-first shielding member 581, a fourth-second shielding member 582, a first cushion member 585, a second cushion member 586, a fifth-first shielding member 591, and/or a fifth-second shielding member 592.

According to various embodiments, at least a portion of the first housing 210 combined with at least a portion of the first support member 261 may include a first antenna pattern 505. At least a portion of the second housing 220 combined with at least a portion of the second support member 262 may include a second antenna pattern 506. The first and second antenna patterns 505 and 506 are electrically connected to, for example, the processor 120 and/or the wireless communication module 192 illustrated in FIG. 1A and may operate as antennas for transmitting and receiving radio signals.

According to an embodiment, the flexible display 230 may be disposed on upper surfaces (e.g., first surfaces in the z-axis direction) of the first and second support members 261 and 262.

According to an embodiment, the display panel 430 may receive power from a power management module (e.g., the power management module 188 in FIG. 1A) and display various kinds of information by emitting light under the control of a display driver IC (e.g., the display driver IC 165 in FIG. 1B). The display panel 430 may include, for example, a plurality of pixels and a wiring structure. The display panel 430 may be disposed on an upper surface (e.g., a front surface in the z-axis direction) of the flexible display 230.

According to an embodiment, the support plate 450 may be disposed on a lower surface (e.g., a surface in the negative z-axis direction) of the display panel 430. The support plate 450 may be a lattice structure having at least one opening 511 around the folding axis A. Through the at least one opening 511, the support plate 450 may provide an elastic force (e.g., flexibility) for a third panel area (e.g., the third panel area 430c in FIG. 4A) of the display panel 430 adjacent to the folding axis A. The support plate 450 may include a material of metal, glass, and/or polymer. The support plate 450 may include one of a metal layer, carbon fiber reinforced plastics (CFRP), or glass fiber reinforced plastics (GFRP).

According to various embodiments, the display panel 430 and the support plate 450 may be adhered to each other using a first adhesive member P1 and a second adhesive member P2, which are spaced apart through a first gap g1. The first gap g1 may be formed at a position corresponding to the opening 511 of the support plate 450 adjacent to the folding axis A. The first adhesive member P1 may be disposed on the lower surface (e.g., in the negative z-axis direction) of the display panel 430 in the first direction (e.g., the x-axis direction) based on the first gap g1. The second adhesive member P2 may be disposed on the lower surface (e.g., in the negative z-axis direction) of the display panel 430 in the second direction (e.g., the negative x-axis direction) based on the first gap g1.

According to various embodiments, the first adhesive member P1 and the second adhesive member P2 may include one of an optical clear adhesive (OCA), a pressure sensitive adhesive (PSA), a thermoplastic polyurethane adhesive, or a double-sided tape. Other adhesive members (e.g., a third adhesive member P3 to a seventh adhesive member P7) described below may also include one of the OCA, the PSA, the thermoplastic polyurethane adhesive, or the double-sided tape.

According to an embodiment, the first digitizer 521 and the second digitizer 522 may be disposed on a lower surface (e.g., a surface in the negative z-axis direction) of the support plate 450 using a third adhesive member P3. The first digitizer 521 and the second digitizer 522 may be spaced apart from each other through a second gap g2. The second gap g2 may be formed adjacent to the folding axis A. The first digitizer 521 may be disposed on a lower surface (e.g., in the negative z-axis direction) of the third adhesive member P3 in the first direction (e.g., the x-axis direction) based on the second gap g2. The second digitizer 522 may be disposed on the lower surface (e.g., in the negative z-axis direction) of the third adhesive member P3 in the second direction (e.g., the negative x-axis direction) based on the second gap g2. The first digitizer 521 and the second digitizer 522 may detect an input signal by a stylus pen (e.g., an electronic pen) of an electromagnetic induction type.

According to an embodiment, the first-first shielding member 531 and the first-second shielding member 532 may be disposed on lower surfaces (e.g., surfaces in the negative z-axis direction) of the first and second digitizers 521 and 522. The first-first shielding member 531 and the first-second shielding member 532 may be spaced apart from each other through a third gap g3. The third gap g3 may be formed adjacent to the folding axis A. The second gap g2 formed between the first and second digitizers 521 and 522 and the third gap g3 formed between the first-first and first-second shielding members 531 and 532 may be formed at a substantially corresponding position with respect to the folding axis A. The first-first shielding member 531 may be disposed on the lower surface (e.g., in the negative z-axis direction) of the first digitizer 521 in the first direction (e.g., the x-axis direction) based on the third gap g3. The first-second shielding member 532 may be disposed on the lower surface (e.g., in the negative z-axis direction) of the second digitizer 522 in the second direction (e.g., the negative x-axis direction) based on the third gap g3. The first-first shielding member 531 and the first-second shielding member 532 may shield noise and/or electromagnetic interference caused by the display panel 430, the first digitizer 521, or the second digitizer 522.

According to an embodiment, the first metal plate 461 and the second metal plate 462 may be disposed on lower surfaces (e.g., surfaces in the negative z-axis direction) of the first-first shielding member 531 and the first-second shielding member 532. The first metal plate 461 and the second plate 462 may be spaced apart from each other through a fourth gap g4. The fourth gap g4 may be formed adjacent to the folding axis A. The fourth gap g4 formed between the first and second metal plates 461 and 462 and the third gap g3 formed between the first-first and first-second shielding members 531 and 532 may be formed at a substantially corresponding position with respect to the folding axis A. The first metal plate 461 may be disposed on the lower surface (e.g., in the negative z-axis direction) of the first-first shielding member 531 in the first direction (e.g., the x-axis direction) based on the fourth gap g4. The second metal plate 462 may be disposed on the lower surface (e.g., in the negative z-axis direction) of the first-second shielding member 532 in the second direction (e.g., the negative x-axis direction) based on the fourth gap g4. The first and second metal plates 461 and 462 may provide rigidity to support the first and second digitizers 521 and 522 and the display panel 430.

According to various embodiments, the first and second metal plates 461 and 462 are metal sheets made of a conductive material and may provide rigidity to the foldable electronic device 200. In an embodiment, the first and second metal plates 461 and 462 may include at least one of Cu, Al, SUS, or CLAD (e.g., a stacked member in which SUS and Al are alternately disposed). In an embodiment, the first and second metal plates 461 and 462 may include other alloy materials.

According to various embodiments, an edge portion of the first metal plate 461 in the first direction (e.g., the x-axis direction) may be removed, and a fourth adhesive member P4 may be disposed. An edge portion of the second metal plate 462 in the second direction (e.g., the negative x-axis direction) may be removed, and a fifth adhesive member P5 may be disposed. The fourth and fifth adhesive members P4 and P5 may include a double-sided tape.

According to an embodiment, the second-first shielding member 551 may be disposed on a lower surface (e.g., in the negative z-axis direction) of the fourth adhesive member P4. The second-second shielding member 552 may be disposed on a lower surface (e.g., in the negative z-axis direction) of the fifth adhesive member P5. The second-first shielding member 551 and the second-second shielding member 552 may shield magnetic force transmitted from the first magnet 301 and the second magnet 302.

According to various embodiments, each of the second-first shielding member 551 and the second-second shielding member 552 may include an amorphous ribbon sheet (ARS) or a nanocrystal sheet.

According to an embodiment, the fifth-first shielding member 591 may be disposed on a lower surface (e.g., in the negative z-axis direction) of the second-first shielding member 551. The fifth-second shielding member 592 may be disposed on a lower surface (e.g., in the negative z-axis direction) of the second-second shielding member 552. Each of the fifth-first shielding member 591 and the fifth-second shielding member 592 may include a metal sheet such as a steel plate cold commercial (SPCC).

According to various embodiments, the fifth-first shielding member 591 may be disposed at a position corresponding to the first magnet 301 of the first support member 261. The fifth-first shielding member 591 may be disposed to be spaced apart from the first magnet 301 of the first support member 261. The fifth-second shielding member 592 may be disposed at a position corresponding to the second magnet 302 of the second support member 261. The fifth-second shielding member 592 may be disposed to be spaced apart from the second magnet 302 of the second support member 261.

According to various embodiments, the fifth-first shielding member 591 may shield between the first antenna pattern 505 and a portion (e.g., in the x-axis direction) of the support plate 450 which is a lattice structure having at least one opening 511. The fifth-second shielding member 592 may shield between the second antenna pattern 506 and a portion (e.g., in the negative x-axis direction) of the support plate 450 which is a lattice structure having at least one opening 511. In an embodiment, the support plate 450 may include either carbon fiber reinforced plastics (CFRP) or glass fiber reinforced plastics (GFRP).

According to an embodiment, the first heat dissipation member 561 and the second heat dissipation member 562 may be disposed on lower surfaces (e.g., in the negative z-axis direction) of the first metal plate 461 and the second metal plate 462. The first heat dissipation member 561 and the second heat dissipation member 562 may be spaced apart from each other through a fifth gap g5. The fifth gap g5 may be formed adjacent to the folding axis A. The fifth gap g5 formed between the first and second heat dissipation members 561 and 562 and the fourth gap g4 formed between the first and second metal plates 461 and 462 may be formed at a substantially corresponding position with respect to the folding axis A. The first heat dissipation member 561 may be disposed on the lower surface (e.g., in the negative z-axis direction) of the first metal plate 461 in the first direction (e.g., the x-axis direction) based on the fifth gap g5. The second heat dissipation member 562 may be disposed on the lower surface (e.g., in the negative z-axis direction) of the second metal plate 462 in the second direction (e.g., the negative x-axis direction) based on the fifth gap g5. The first and second heat dissipation members 561 and 562 may dissipate heat generated from the display panel 430 into first and second spaces S1 and S2.

According to various embodiments, the first space S1 may be formed between the first support member 261 and the first heat dissipation member 561. The second space S2 may be formed between the second support member 262 and the second heat dissipation member 562. The first and second heat dissipation members 561 and 562 may include a graphite sheet.

According to an embodiment, a sixth adhesive member P6 may be disposed between the first heat dissipation member 561 and the second-first shielding member 551. The sixth adhesive member P6 may couple the first metal plate 461 and the first support member 261 to each other. A seventh adhesive member P7 may be disposed between the second heat dissipation member 562 and the second-second shielding member 552. The seventh adhesive member P7 may couple the second metal plate 462 and the second support member 262 to each other.

According to an embodiment, the third-first shielding member 571 and the third-second shielding member 572 may be spaced apart from each other through a sixth gap g6. The sixth gap g6 may be formed adjacent to the folding axis A. The sixth gap g6 formed between the third-first and third-second shielding members 571 and 572 and the fifth gap g5 formed between the first and second heat dissipation members 561 and 562 may be formed at a substantially corresponding position with respect to the folding axis A.

According to various embodiments, the third-first shielding member 571 may be disposed in the first space S1. The third-first shielding member 571 may be disposed on an upper surface (e.g., a surface in the z-axis direction) of the first support member 261. The third-first shield member 571 may be disposed on an upper surface of the first magnetization region 501 that may be formed in the first support member 261 and/or the first side of the hinge plate 320 by an external magnetic force. The third-second shielding member 572 may be disposed in the second space S2. The third-second shielding member 572 may be disposed on an upper surface (e.g., a surface in the z-axis direction) of the second support member 262.

According to various embodiments, the third-second shield member 572 may be disposed on an upper surface of the second magnetization region 502 that may be formed in the second support member 262 and/or the second side of the hinge plate 320 by an external magnetic force. The third-first and third-second shielding members 571 and 572 may include an amorphous ribbon sheet (ARS) or a nano-crystal sheet. According to various embodiments, the third-first and third-second shielding members 571 and 572 may shield a magnetic force (e.g., magnetism) for the first and second magnetization regions 501 and 502.

According to an embodiment, the fourth-first shielding member 581 and the fourth-second shielding member 582 may be spaced apart from each other through a sixth gap g6.

The fourth-first shielding member 581 may be disposed in the first space S1. The fourth-first shielding member 581 may be disposed on an upper surface (e.g., a surface in the z-axis direction) of the third-first shielding member 571.

According to various embodiments, at least a portion of the fourth-first shielding member 581 may surround one side surface (e.g., a surface adjacent to the folding axis A) of the third-first shielding member 571. The at least a portion of the fourth-first shielding member 581 may surround the one side surface (e.g., a surface adjacent to the folding axis A) of the third-first shielding member 571 through the sixth gap g6.

According to various embodiments, at least a portion of the fourth-second shielding member 582 may surround one side surface (e.g., a surface adjacent to the folding axis A) of the third-second shielding member 572. The at least a portion of the fourth-second shielding member 582 may surround the one side surface (e.g., a surface adjacent to the folding axis A) of the third-second shielding member 572 through the sixth gap g6.

According to various embodiments, the fourth-first and fourth-second shielding members 581 and 582 may include a metal sheet made of a conductive material such as a steel plate cold commercial (SPCC). The fourth-first and fourth-second shielding members 581 and 582 may shield a reactance component from being transmitted to a portion of the first digitizer 521 and/or the second digitizer 522 through, for example, the second gap g2 to the sixth gap g6.

According to an embodiment, the first cushion member 585 may be disposed in the first space S1. The first cushion member 585 may be disposed between the third-first shielding member 571 and the sixth adhesive member P6. The first cushion member 585 may be disposed on the upper surface (e.g., the surface in the z-axis direction) of the first support member 261 between the third-first shielding member 571 and the sixth adhesive member P6. The second cushion member 586 may be disposed in the second space S2. The second cushion member 586 may be disposed between the third-second shielding member 572 and the seventh adhesive member P7. The second cushion member 586 may be disposed on the upper surface (e.g., the surface in the z-axis direction) of the second support member 262 between the third-second shielding member 572 and the seventh adhesive member P7. The first and second cushion members 585 and 586 may absorb at least a portion of an external force applied to the display panel 430. The first and second cushion members 585 and 586 may include a sponge or rubber material.

Figure 6:
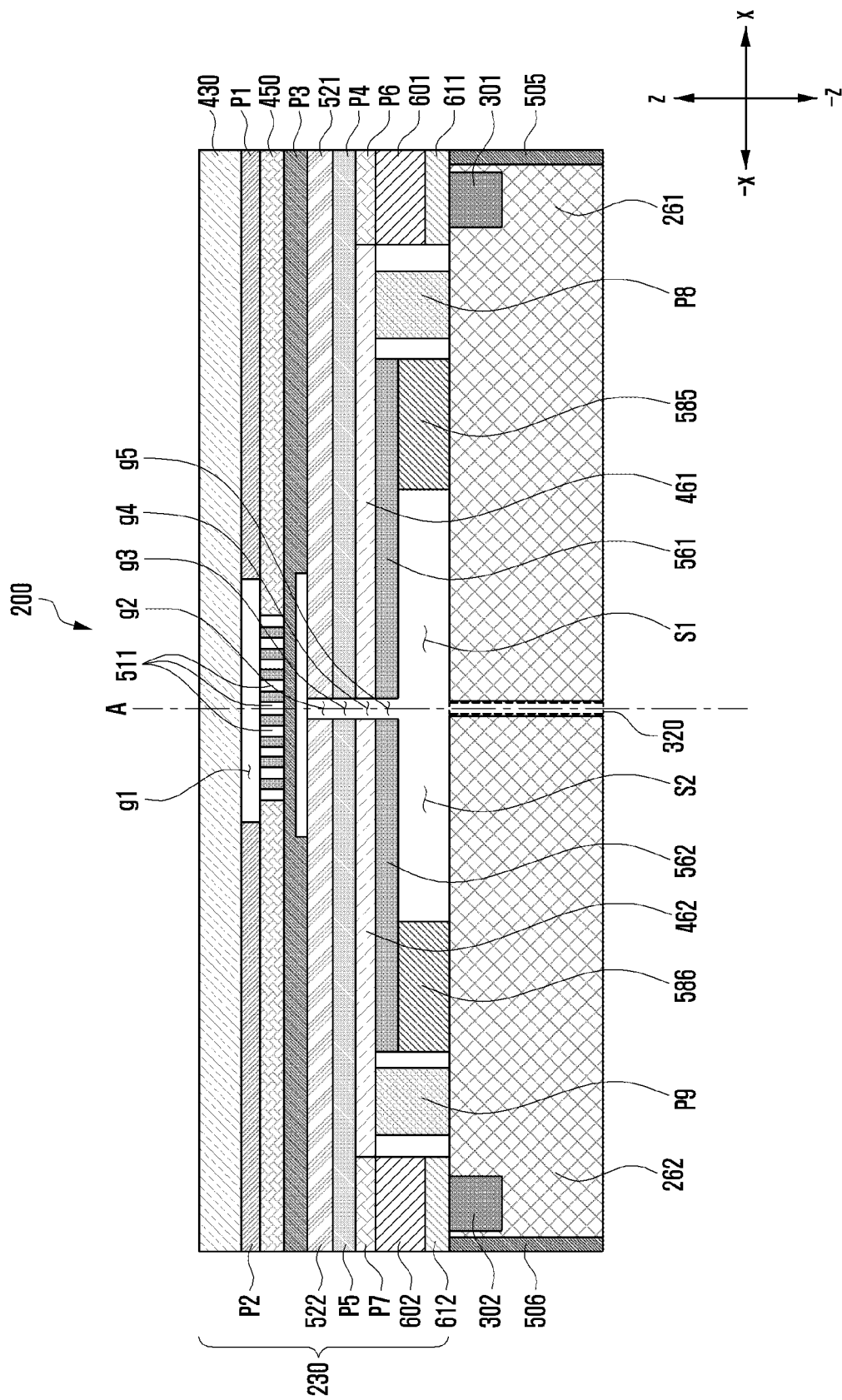
FIG. 6 is a cross-sectional view illustrating a portion of the flexible display of the electronic device, after the flexible display is disposed on the first and second housings, illustrated in FIG. 4B taken along the line C-C' according to various embodiments.

FIG. 6 is a cross-sectional view illustrating a portion of the flexible display of the electronic device, after the flexible is disposed on the first and second housings, illustrated in FIG. 4B taken along the line C-C' according to various embodiments.

According to various embodiments, the embodiments of the foldable electronic device 200 illustrated in FIG. 6 may include the embodiments illustrated in FIGS. 1A, 1B, 2A, 2B, 3A, 3B, 4A, 4B and 5 (which may be referred to as FIGS. 1A to 5). According to an embodiment, the embodiments illustrated in FIGS. 5 and 6 may be integrated with each other, except for substantially the same arrangements.

In the following description of embodiments, the same reference numerals are assigned to components substantially the same as or similar to those of the above-described embodiments shown in FIGS. 1A to 5, and overlapping descriptions of their functions may not be repeated.

With reference to FIG. 6, the foldable electronic device 200 according to various embodiments of the disclosure may include the first support member 261 (e.g., the first housing 210) and the second support member 262 (e.g., the second housing 220) that are foldable to face each other based on the hinge plate 320 (e.g., the hinge plate 320 in FIG. 4A or 4B) (e.g., with respect to the folding axis A). In the foldable electronic device 200, the flexible display 230 may be disposed on upper surfaces (e.g., the first surface in the z-axis direction) of the first and second support members 261 and 262.

According to an embodiment, the first support member 261 (e.g., the first support member 261 in FIG. 4B) may be combined at least in part with a first side (e.g., in the x-axis direction) of the hinge plate 320. The second support member 262 (e.g., the second support member 262 in FIG. 4B) may be combined at least in part with a second side (e.g., in the negative x-axis direction) of the hinge plate 320. The first and second support members 261 and 262 may be configured to enable the unfolding state and/or the folding state based on the hinge plate 320 (e.g., the folding axis A). The flexible display 230 may be supported on the first and second support members 261 and 262 and configured to be unfolded or folded through the hinge plate 320 depending on the unfolding state or folding state of the first and second support members 261 and 262.

According to an embodiment, the first magnet 301 may be disposed on an upper surface (e.g., a first surface in the z-axis direction) of an edge of the first support member 261 in a first direction (e.g., the x-axis direction). The second magnet 302 may be disposed on an upper surface (e.g., a first surface in the z-axis direction) of an edge of the second support member 262 in a second direction (e.g., the negative x-axis direction). When the foldable electronic device 200 is folded, the first magnet 301 and the second magnet 302 may be coupled by a magnetic force.

According to various embodiments, as described with reference to FIG. 4B, for example, the first magnet 301 may be disposed between the first side member 213 and the first support member 261. The second magnet 302 may be disposed between the second side member 223 and the second support member 262.

According to various embodiments, at least a portion of the first housing 210 combined with at least a portion of the first support member 261 may include a first antenna pattern 505. At least a portion of the second housing 220 combined with at least a portion of the second support member 262 may include a second antenna pattern 506. The first and second antenna patterns 505 and 506 are electrically connected to, for example, the processor 120 and/or the wireless communication module 192 illustrated in FIG. 1A and may operate as antennas for transmitting and receiving radio signals.

According to an embodiment, the foldable display 230 (e.g., the display module 160 in FIG. 1B) may include the display panel 430, the support plate 450, the first digitizer 521, the second digitizer 522, the first metal plate 461, the second metal plate 462, a first-first shielding member 601, a first-second shielding member 602, a second-first shielding member 611, a second-second shielding member 612, the first heat dissipation member 561, the second heat dissipation member 562, the first cushion member 585, and/or the second cushion member 586.

According to an embodiment, the flexible display 230 may be disposed on upper surfaces (e.g., first surfaces in the z-axis direction) of the first and second support members 261 and 262.

According to an embodiment, the display panel 430 may receive power from a power management module (e.g., the power management module 188 in FIG. 1A) and display various kinds of information by emitting light under the control of a display driver IC (e.g., the display driver IC 165 in FIG. 1B). The display panel 430 may include, for example, a plurality of pixels and a wiring structure. The display panel 430 may be disposed on an upper surface (e.g., a front surface in the z-axis direction) of the flexible display 230.

According to an embodiment, the support plate 450 may be disposed on a lower surface (e.g., a surface in the negative z-axis direction) of the display panel 430. The support plate 450 may be a lattice structure having at least one opening 511 around the folding axis A. Through the at least one opening 511, the support plate 450 may provide an elastic force (e.g., flexibility) for a third panel area (e.g., the third panel area 430c in FIG. 4A) of the display panel 430 adjacent to the folding axis A. The support plate 450 may include a material of glass and/or polymer. The support plate 450 may include either carbon fiber reinforced plastics (CFRP) or glass fiber reinforced plastics (GFRP).

According to various embodiments, the display panel 430 and the support plate 450 may be adhered to each other using a first adhesive member P1 and a second adhesive member P2, which are spaced apart through a first gap g1. The first gap g1 may be formed at a position corresponding to the opening 511 of the support plate 450 adjacent to the folding axis A. The first adhesive member P1 may be disposed on the lower surface (e.g., in the negative z-axis direction) of the display panel 430 in the first direction (e.g., the x-axis direction) based on the first gap g1. The second adhesive member P2 may be disposed on the lower surface (e.g., in the negative z-axis direction) of the display panel 430 in the second direction (e.g., the negative x-axis direction) based on the first gap g1.

According to various embodiments, the first adhesive member P1 and the second adhesive member P2 may include one of an optical clear adhesive (OCA), a pressure sensitive adhesive (PSA), a thermoplastic polyurethane adhesive, or a double-sided tape. Other adhesive members (e.g., a third adhesive member P3 to a ninth adhesive member P9) described below may also include one of the OCA, the PSA, the thermoplastic polyurethane adhesive, or the double-sided tape.

According to an embodiment, the first digitizer 521 and the second digitizer 522 may be disposed on a lower surface (e.g., a surface in the negative z-axis direction) of the support plate 450 using a third adhesive member P3. The first digitizer 521 and the second digitizer 522 may be spaced apart from each other through a second gap g2. The second gap g2 may be formed adjacent to the folding axis A. The first digitizer 521 may be disposed on a lower surface (e.g., in the negative z-axis direction) of the third adhesive member P3 in the first direction (e.g., the x-axis direction) based on the second gap g2. The second digitizer 522 may be disposed on the lower surface (e.g., in the negative z-axis direction) of the third adhesive member P3 in the second direction (e.g., the negative x-axis direction) based on the second gap g2. The first digitizer 521 and the second digitizer 522 may detect an input signal by a stylus pen (e.g., an electronic pen) of an electromagnetic induction type.

According to an embodiment, the first digitizer 521 and the first metal plate 461 may be coupled using a fourth adhesive member P4. The second digitizer 522 and the second metal plate 462 may be coupled using a fifth adhesive member P5. The fourth adhesive member P4 and the fifth adhesive member P5 may be spaced apart from each other through a third gap g3. The third gap g3 formed between the fourth and fifth adhesive members P4 and P5 and the second gap g2 formed between the first and second digitizers 521 and 522 may be formed at a substantially corresponding position with respect to the folding axis A. The fourth adhesive member P4 may be disposed on the lower surface (e.g., in the negative z-axis direction) of the first digitizer 521 in the first direction (e.g., the x-axis direction) based on the third gap g3. The fifth adhesive member P5 may be disposed on the lower surface (e.g., in the negative z-axis direction) of the second digitizer 522 in the second direction (e.g., the negative x-axis direction) based on the third gap g3.

According to an embodiment, the first metal plate 461 and the second metal plate 462 may be disposed on lower surfaces (e.g., surfaces in the negative z-axis direction) of the fourth adhesive member P4 and the fifth adhesive member P5. The first metal plate 461 and the second plate 462 may be spaced apart from each other through a fourth gap g4. The fourth gap g4 may be formed adjacent to the folding axis A. The fourth gap g4 formed between the first and second metal plates 461 and 462 and the third gap g3 formed between the fourth and fifth adhesive members P4 and P5 may be formed at a substantially corresponding position with respect to the folding axis A. The first metal plate 461 may be disposed on the lower surface (e.g., in the negative z-axis direction) of the fourth adhesive member P4 in the first direction (e.g., the x-axis direction) based on the fourth gap g4. The second metal plate 462 may be disposed on the lower surface (e.g., in the negative z-axis direction) of the fifth adhesive member P5 in the second direction (e.g., the negative x-axis direction) based on the fourth gap g4. The first and second metal plates 461 and 462 may provide rigidity to support the first and second digitizers 521 and 522 and the display panel 430.

According to various embodiments, the first and second metal plates 461 and 462 are metal sheets made of a conductive material and may provide rigidity to the foldable electronic device 200. In an embodiment, the first and second metal plates 461 and 462 may include at least one of Cu, Al, SUS, or CLAD (e.g., a stacked member in which SUS and Al are alternately disposed). In an embodiment, the first and second metal plates 461 and 462 may include other alloy materials.

According to various embodiments, an edge portion of the first metal plate 461 in the first direction (e.g., the x-axis direction) may be removed, and a sixth adhesive member P6 may be disposed. An edge portion of the second metal plate 462 in the second direction (e.g., the negative x-axis direction) may be removed, and a seventh adhesive member P7 may be disposed. The sixth and seventh adhesive members P6 and P7 may include a double-sided tape.

According to an embodiment, the first-first shielding member 601 may be disposed on a lower surface (e.g., in the negative z-axis direction) of the sixth adhesive member P6. The first-second shielding member 602 may be disposed on a lower surface (e.g., in the negative z-axis direction) of the seventh adhesive member P7. The first-first shielding member 601 and the first-second shielding member 602 may shield magnetic force transmitted from the first magnet 301 and the second magnet 302.

According to various embodiments, each of the first-first shielding member 601 and the first-second shielding member 602 may include an amorphous ribbon sheet (ARS) or a nanocrystal sheet.

According to an embodiment, the second-first shielding member 611 may be disposed on a lower surface (e.g., in the negative z-axis direction) of the first-first shielding member 601. The second-second shielding member 612 may be disposed on a lower surface (e.g., in the negative z-axis direction) of the first-second shielding member 602. Each of the second-first shielding member 611 and the second-second shielding member 612 may include a metal sheet such as a steel plate cold commercial (SPCC).

According to various embodiments, the second-first shielding member 611 may be disposed at a position corresponding to the first magnet 301 of the first support member 261. The second-first shielding member 611 may be combined with the first magnet 301 of the first support member 261. The second-second shielding member 612 may be disposed at a position corresponding to the second magnet 302 of the second support member 261. The second-second shielding member 612 may be combined with the second magnet 302 of the second support member 261.

According to various embodiments, the second-first shielding member 611 may shield between the first antenna pattern 505 and a portion (e.g., in the x-axis direction) of the support plate 450 which is a lattice structure having at least one opening 511. The second-second shielding member 612 may shield between the second antenna pattern 506 and a portion (e.g., in the negative x-axis direction) of the support plate 450 which is a lattice structure having at least one opening 511. In an embodiment, the support plate 450 may include either carbon fiber reinforced plastics (CFRP) or glass fiber reinforced plastics (GFRP).

According to an embodiment, the first heat dissipation member 561 and the second heat dissipation member 562 may be disposed on lower surfaces (e.g., in the negative z-axis direction) of the first metal plate 461 and the second metal plate 462. The first heat dissipation member 561 and the second heat dissipation member 562 may be spaced apart from each other through a fifth gap g5. The fifth gap g5 may be formed adjacent to the folding axis A. The fifth gap g5 formed between the first and second heat dissipation members 561 and 562 and the fourth gap g4 formed between the first and second metal plates 461 and 462 may be formed at a substantially corresponding position with respect to the folding axis A. The first heat dissipation member 561 may be disposed on the lower surface (e.g., in the negative z-axis direction) of the first metal plate 461 in the first direction (e.g., the x-axis direction) based on the fifth gap g5. The second heat dissipation member 562 may be disposed on the lower surface (e.g., in the negative z-axis direction) of the second metal plate 462 in the second direction (e.g., the negative x-axis direction) based on the fifth gap g5. The first and second heat dissipation members 561 and 562 may dissipate heat generated from the display panel 430 into first and second spaces S1 and S2.

According to various embodiments, the first space S1 may be formed between the first support member 261 and the first heat dissipation member 561. The second space S2 may be formed between the second support member 262 and the second heat dissipation member 562. The first and second heat dissipation members 561 and 562 may include a graphite sheet.

According to an embodiment, an eighth adhesive member P8 may be disposed between the first heat dissipation member 561 and the first-first shielding member 601 (or the second-first shielding member 611). The eighth adhesive member P8 may couple the first metal plate 461 and the first support member 261 to each other. A ninth adhesive member P9 may be disposed between the second heat dissipation member 562 and the first-second shielding member 602 (or the second-second shielding member 612). The ninth adhesive member P9 may couple the second metal plate 462 and the second support member 262 to each other.

According to an embodiment, the first cushion member 585 may be disposed in the first space S1. The first cushion member 585 may be disposed between the first heat dissipation member 561 and the first support member 261. The second cushion member 586 may be disposed in the second space S2. The second cushion member 586 may be disposed between the second heat dissipation member 562 and the second support member 262. The first and second cushion members 585 and 586 may absorb at least a portion of an external force applied to the display panel 430. The first and second cushion members 585 and 586 may include a sponge or rubber material.

According to various example embodiments of the disclosure, an electronic device may include: a hinge plate coupled at least in part between a first support with a first magnet and a second support with a second magnet, a first housing coupled at least in part to a first side of the hinge plate through the first support, a second housing coupled at least in part to a second side of the hinge plate through the second support and configured to be foldable with the first housing through the hinge plate, and a flexible display supported on the first and second supports and configured to be foldable. The flexible display may include: a display panel; a support plate disposed on a lower surface of the display panel; a first digitizer and a second digitizer disposed on a lower surface of the support plate spaced apart from each other through a second gap; a first-first shielding member comprising a magnetic shielding material and a first-second shielding member comprising a magnetic shielding material disposed on lower surfaces of the first and second digitizers spaced apart from each other through a third gap; a first metal plate and a second metal plate disposed on lower surfaces of the first-first and first-second shielding members spaced apart from each other through a fourth gap; a third-first shielding member comprising a magnetic shielding material disposed on an upper surface of a first magnetization region of the first support in a first space between the first metal plate and the first support, and a third-second shielding member comprising a magnetic shielding material spaced apart from the third-first shielding member through a sixth gap and disposed on an upper surface of a second magnetization region of the second support in a second space between the second metal plate and the second support; and a fourth-first shielding member comprising a magnetic shielding material disposed on an upper surface of the third-first shielding member and disposed to surround at least a portion of the third-first shielding member through the sixth gap, and a fourth-second shielding member comprising a magnetic shielding material spaced apart from the fourth-first shielding member through the sixth gap, disposed on an upper surface of the third-second shielding member, and disposed to surround at least a portion of the third-second shielding member through the sixth gap. According to various embodiments, the support plate may have at least one opening around a folding axis of the hinge plate.

According to various example embodiments, the support plate may include one of a metal layer, carbon fiber reinforced plastics (CFRP), or glass fiber reinforced plastics (GFRP).

According to various example embodiments, an edge portion of the first metal plate in a first direction may be removed, and a fourth adhesive member comprising an adhesive material may be disposed in the removed portion. Also, an edge portion of the second metal plate in a second direction may be removed, and a fifth adhesive member comprising an adhesive material may be disposed in the removed portion.

According to various example embodiments, a second-first shielding member comprising a magnetic shielding material may be disposed on a lower surface of the fourth adhesive member, and a second-second shielding member comprising a magnetic shielding material may be disposed on a lower surface of the fifth adhesive member.

According to various example embodiments, the second-first shielding member may be configured to shield a magnetic force transmitted from the first magnet, and the second-second shielding member may be configured to shield a magnetic force transmitted from the second magnet.

According to various example embodiments, a fifth-first shielding member comprising a magnetic shielding material may be disposed on a lower surface of the second-first shielding member spaced apart from the first magnet, and a fifth-second shielding member comprising a magnetic shielding material may be disposed on a lower surface of the second-second shielding member spaced apart from the second magnet.

According to various example embodiments, at least a portion of the first housing may include a first antenna pattern, at least a portion of the second housing may include a second antenna pattern, the fifth-first shielding member may provide a shield between the first antenna pattern and a portion of the support plate, and the fifth-second shielding member may provide shield between the second antenna pattern and a portion of the support plate.

According to various example embodiments, a first heat dissipation member comprising a heat conducting material and a second heat dissipation member comprising a heat conducting material may be disposed on lower surfaces of the first and second metal plates and spaced apart from each other through a fifth gap.

According to various example embodiments, the second gap, the third gap, the fourth gap, the fifth gap, and the sixth gap may be formed at positions substantially corresponding to a folding axis of the hinge plate.

According to various example embodiments, a sixth adhesive member comprising an adhesive material may be disposed between the first heat dissipation member and the second-first shielding member and may be configured to couple the first metal plate and the first support, and a seventh adhesive member comprising an adhesive material may be disposed between the second heat dissipation member and the second-second shielding member and may be configured to couple the second metal plate and the second support member.

According to various example embodiments, a first cushion member comprising a cushioning material may be disposed between the third-first shielding member and the sixth adhesive member, and a second cushion member comprising a cushioning material may be disposed between the third-second shielding member and the seventh adhesive member.

According to various example embodiments, the third-first shielding member and the third-second shielding member may include an amorphous ribbon sheet (ARS) or a nano crystal sheet.

According to various example embodiments, the fourth-first shielding member and the fourth-second shielding member may include a conductive sheet.

According to various example embodiments, the third-first shielding member and the third-second shielding member may be configured to shield a magnetic force for the first magnetization region and the second magnetization region.

According to various example embodiments, the fourth-first shielding member and the fourth-second shielding member may be configured to shield a reactance component from being transmitted to a portion of the first digitizer and/or the second digitizer.

According to various example embodiments, the display panel and the support plate may be adhered to each other through a first adhesive member comprising an adhesive material and a second adhesive member comprising an adhesive material spaced apart through a first gap.

According to various example embodiments, the first digitizer and the second digitizer may be adhered to the lower surface of the support plate through a third adhesive member comprising an adhesive material.

According to various example embodiments, the second gap, the third gap, the fourth gap, and the sixth gap may be formed at positions substantially corresponding to a folding axis of the hinge plate.

According to various example embodiments, the first magnetization region and the second magnetization region may be formed by an external magnetic force.

While the disclosure has been illustrated and described with reference to various example embodiments, it will be understood that the various example embodiments are intended to be illustrative, not limiting. It will be further understood by those skilled in the art that various changes and modifications can be made without departing from the true spirit and full scope of the disclosure including the appended claims and their equivalents. It will also be understood that any of the embodiment(s) described herein may be used in conjunction with any other embodiment(s) described herein.

What is claimed is:

1. A foldable electronic device comprising:
   a hinge plate coupled at least in part between a first support including a first magnet and a second support including a second magnet;
   a first housing coupled at least in part to a first side of the hinge plate through the first support;
   a second housing coupled at least in part to a second side of the hinge plate through the second support and configured to be foldable with the first housing through the hinge plate; and
   a flexible display supported on the first and second supports and configured to be foldable,
   wherein the flexible display includes:
   a display panel;
   a support plate disposed on a lower surface of the display panel;
   a first digitizer and a second digitizer disposed on a lower surface of the support plate spaced apart from each other through a second gap;
   a first-first shielding member comprising a magnetic shielding material and a first-second shielding member comprising a magnetic shielding material disposed on lower surfaces of the first and second digitizers, respectively and spaced apart from each other through a third gap;
   a first metal plate and a second metal plate disposed on lower surfaces of the first-first and first-second shielding members, respectively, and spaced apart from each other through a fourth gap;
   a third-first shielding member comprising a magnetic shielding material disposed on an upper surface of a first magnetization region of the first support in a first space between the first metal plate and the first support, and a third-second shielding member comprising a magnetic shielding material spaced apart from the third-first shielding member through a sixth gap and disposed on an upper surface of a second magnetization region of the second support in a second space between the second metal plate and the second support; and a fourth-first shielding member comprising a magnetic shielding material disposed on an upper surface of the third-first shielding member and surrounding at least a portion of the third-first shielding member through the sixth gap, and a fourth-second shielding member comprising a magnetic shielding material spaced apart from the fourth-first shielding member through the sixth gap, disposed on an upper surface of the third-second shielding member, and surrounding at least a portion of the third-second shielding member through the sixth gap.

2. The electronic device of claim 1, wherein the support plate has at least one opening within a specified distance of a folding axis of the hinge plate.

3. The electronic device of claim 1, wherein the support plate includes one of a metal layer, carbon fiber reinforced plastics (CFRP), or glass fiber reinforced plastics (GFRP).

4. The electronic device of claim 1, wherein an edge portion of the first metal plate in a first direction is removed, and a fourth adhesive member comprising an adhesive material is disposed in the removed portion, and wherein an edge portion of the second metal plate in a second direction is removed, and a fifth adhesive member comprising an adhesive material is disposed in the removed portion.

5. The electronic device of claim 4, wherein a second-first shielding member comprising a magnetic shielding material is disposed on a lower surface of the fourth adhesive member, and a second-second shielding member comprising a magnetic shielding material is disposed on a lower surface of the fifth adhesive member.

6. The electronic device of claim 5, wherein the second-first shielding member is configured to shield a magnetic force transmitted from the first magnet, and the second-second shielding member is configured to shield a magnetic force transmitted from the second magnet.

7. The electronic device of claim 4, wherein a fifth-first shielding member comprising a magnetic shielding material is disposed on a lower surface of the second-first shielding member spaced apart from the first magnet, and a fifth-second shielding member comprising a magnetic shielding material is disposed on a lower surface of the second-second shielding member spaced apart from the second magnet.

8. The electronic device of claim 7, wherein at least a portion of the first housing includes a first antenna pattern, at least a portion of the second housing includes a second antenna pattern, the fifth-first shielding member provides a shield between the first antenna pattern and a portion of the support plate, and the fifth-second shielding member provides a shield between the second antenna pattern and a portion of the support plate.

9. The electronic device of claim 4, wherein a first heat dissipation member comprising a heat conducting material and a second heat dissipation member comprising a heat conducting material are disposed on lower surfaces of the first and second metal plates, respectively, and are spaced apart from each other through a fifth gap.

10. The electronic device of claim 9, wherein the second gap, the third gap, the fourth gap, the fifth gap, and the sixth gap are formed at positions substantially corresponding to a folding axis of the hinge plate.

11. The electronic device of claim 9, wherein a sixth adhesive member comprising an adhesive material is disposed between the first heat dissipation member and the second-first shielding member and is configured to couple the first metal plate and the first support, and a seventh adhesive member comprising an adhesive material is disposed between the second heat dissipation member and the second-second shielding member and is configured to couple the second metal plate and the second support.

12. The electronic device of claim 11, wherein a first cushion member comprising a cushioning material is disposed between the third-first shielding member and the sixth adhesive member, and a second cushion member comprising a cushioning material is disposed between the third-second shielding member and the seventh adhesive member.

13. The electronic device of claim 1, wherein the third-first shielding member and the third-second shielding member include an amorphous ribbon sheet (ARS) or a nano crystal sheet.

14. The electronic device of claim 1, wherein the fourth-first shielding member and the fourth-second shielding member include a conductive sheet.

15. The electronic device of claim 1, wherein the third-first shielding member and the third-second shielding member are configured to shield a magnetic force for the first magnetization region and the second magnetization region.

16. The electronic device of claim 1, wherein the fourth-first shielding member and the fourth-second shielding member are configured to shield a reactance component from being transmitted to a portion of the first digitizer and/or the second digitizer.

17. The electronic device of claim 1, wherein the display panel and the support plate are adhered to each other through a first adhesive member comprising an adhesive material and a second adhesive member comprising an adhesive material spaced apart through a first gap.

18. The electronic device of claim 1, wherein the first digitizer and the second digitizer are adhered to the lower surface of the support plate through a third adhesive member comprising an adhesive material.

19. The electronic device of claim 1, wherein the second gap, the third gap, the fourth gap, and the sixth gap are formed at positions substantially corresponding to a folding axis of the hinge plate.

20. The electronic device of claim 1, wherein the first magnetization region and the second magnetization region are formed by an external magnetic force.

* * * * *